(12) United States Patent
Sillard et al.

(10) Patent No.: US 10,871,611 B2
(45) Date of Patent: Dec. 22, 2020

(54) WEAKLY COUPLED FEW-MODE FIBERS FOR SPACE-DIVISION MULTIPLEXING

(71) Applicant: Draka Comteq France, Paron (FR)

(72) Inventors: Pierre Sillard, Paron (FR); Denis Molin, Paron (FR); Marianne Bigot, Paron (FR)

(73) Assignee: Draka Comteq France, Paron (FR)

( * ) Notice: Subject to any disclaimer, the term of this patent is extended or adjusted under 35 U.S.C. 154(b) by 0 days.

(21) Appl. No.: 16/489,983

(22) PCT Filed: Mar. 10, 2017

(86) PCT No.: PCT/IB2017/000349
§ 371 (c)(1),
(2) Date: Aug. 29, 2019

(87) PCT Pub. No.: WO2018/162940
PCT Pub. Date: Sep. 13, 2018

(65) Prior Publication Data
US 2020/0241199 A1    Jul. 30, 2020

(51) Int. Cl.
*G02B 6/028* (2006.01)
*G02B 6/02* (2006.01)
(Continued)

(52) U.S. Cl.
CPC ....... *G02B 6/0288* (2013.01); *G02B 6/02019* (2013.01); *G02B 6/03661* (2013.01); *H04J 14/04* (2013.01)

(58) Field of Classification Search
None
See application file for complete search history.

(56) References Cited

U.S. PATENT DOCUMENTS 5,802,234 A  *  9/1998  Vengsarkar ........ G02B 6/02261
                                                      385/123
8,326,106 B2   12/2012  Fini et al.
(Continued)

FOREIGN PATENT DOCUMENTS

WO    2011094400 A2    8/2011

OTHER PUBLICATIONS

International Preliminary Report on Patentability (IPRP) for PCT/IB2017/000349 dated Sep. 10, 2019 (7 pages).
(Continued)

*Primary Examiner* — Michael Stahl
(74) *Attorney, Agent, or Firm* — Shumaker, Loop & Kendrick, LLP

(57) ABSTRACT

A few mode optical fiber that includes an optical core and an optical cladding surrounding the optical core. The FMF has a step-index profile. The optical core has a core outer radius $R_1 \geq 7.5$ μm and a core refractive index difference $\Delta n_1$ such that $14.5 \times 10^{-3} < \Delta n_1 < 24 \times 10^{-3}$. The optical cladding comprises:
an index ring with:
  a ring inner radius $R_{r1}$ between 12 μm and 19 μm;
  a ring refractive index difference $\Delta n_r$ such that $\Delta n_1/\Delta n_r$ is between 2 and 4;
  a ring volume $V_{ring} = \pi \Delta n_r (R_{r2}^2 - R_{r1}^2)$ between 1.8 μm² and 4.1 μm² where $R_{r2}$ is the ring outer radius;
an inner cladding between the optical core and the index ring, with an inner cladding inner radius $R_{i1}$ and an inner cladding outer radius $R_{i2}$, the inner cladding having an inner cladding refractive index difference $\Delta n_{clad1}$ between $-1.0 \times 10^{-3}$ and $1.0 \times 10^{-3}$.

17 Claims, 5 Drawing Sheets

(51) Int. Cl.
*G02B 6/036* (2006.01)
*H04J 14/04* (2006.01)

(56) References Cited

U.S. PATENT DOCUMENTS

| | | | |
|---|---|---|---|
| 8,971,682 B2 | 3/2015 | Evan et al. | |
| 9,250,383 B2 | 2/2016 | Gruner-Nielsen et al. | |
| 2002/0164140 A1 | 11/2002 | Lysiansky et al. | |
| 2003/0099450 A1* | 5/2003 | Wei | G02B 6/03644 385/127 |
| 2005/0013572 A1* | 1/2005 | Guan | G02B 6/268 385/127 |
| 2013/0071115 A1* | 3/2013 | Bennett | G02B 6/02047 398/44 |
| 2013/0230290 A1 | 9/2013 | Evans et al. | |
| 2014/0064686 A1* | 3/2014 | Lars | G02B 6/0288 385/124 |
| 2014/0093205 A1 | 4/2014 | Gruner-Nielsen et al. | |
| 2016/0306108 A1* | 10/2016 | Sun | H04J 14/04 |
| 2017/0115450 A1* | 4/2017 | Mo | G02B 6/0288 |

OTHER PUBLICATIONS

International Search Report (ISR) for PCT/IB2017/000349 dated Nov. 30, 2017 (3 pages).
Written Opinion (WO) for PCT/IB2017/000349 dated Nov. 30, 2017 (6 pages).
P.Sillard et al.,"Few-Mode Fiber for Uncoupled Mode-Division Multiplexing Transmissions" in Proc. ECOC, 2011, Paper Tu.5.LeCervin.7. 3 pages.
M. Bigot-Astruc et al., "Design and Fabrication of Weakly-Coupled Few-Modes Fibers" in Proc. IEEE Photon. Soc. Summer Top. Meet., 2012, Paper TuC1.1, pp. 189-190.
A. R. May, "Few-Mode Fibers with Improved Mode Spacing" in Proc. ECOC, 2015, p. 1-13.
Soma et al., "Weakly-coupled FMF Transmission for Reduction of MIMO Complexity" in Proc. Photonics Society Summer Topical Meeting Series (SUM), 2016, paper TuE2-2 (11:00AM-11:30 AM), pp. 140-141.

* cited by examiner

WEAKLY COUPLED FEW-MODE FIBERS FOR SPACE-DIVISION MULTIPLEXING

1. FIELD OF THE INVENTION

The invention relates to the field of fiber optic transmission, and, more specifically, to improved few-mode fiber designs for space division multiplexing.

2. BACKGROUND

An optical fiber is conventionally constituted of an optical core, which transmits an optical signal, and of an optical cladding, which confines the optical signal within the optical core. To that end, the refractive index of the core, $n_{co}$, is greater than the one of the cladding, $n_{Cl}$. An optical fiber is generally characterized by a refractive index profile that associates the refractive index (n) with the radius (r) of the optical fiber: the distance r with respect to the center of the optical fiber is shown on x-axis and the difference Dn between the refractive index at radius r, n(r), and the refractive index of the optical cladding $n_{Cl}$ is shown on y-axis.

Nowadays, two main categories of optical fibers exist: multimode fibers and single-mode fibers. In a multimode fiber, for a given wavelength, several optical modes are propagated simultaneously along the optical fiber, whereas in a single-mode fiber, the higher order modes (hereafter called HOMs) are cut-off or highly attenuated.

Single-mode fibers are commonly used for long-distance applications, metropolitan networks, access networks and premises applications in telecommunications, CATV and utility networks. To obtain an optical fiber capable to transmit a single-mode optical signal, a core with a relatively small diameter is required (typically between 5 µm and 11 µm). To meet requirements of high speed or bit-rate applications (for example ≥10 Gbps), standard single-mode fibers require use of a modulated single-mode laser emitter tuned to work typically at a wavelength of 1550 nm. However, single-mode fibers suffer from non-linearity problems, which are major limitations on fiber transmission capacity.

Multimode fibers are commonly used for short-distance applications requiring a high bandwidth, such as local area networks (LANs), multi-dwelling units (MDUs) and Data Centers (DCs), more generally known as in-building networks. The core of a multimode fiber typically has a diameter of 50 µm, or 62.5 µm. The most prevalent multimode fibers in telecommunications are the refractive graded-index profile optical fibers. By minimizing the intermodal dispersion (i.e. the difference between the propagation delay times or group velocity of the optical modes along the optical fiber, also called DMGD for Differential Mode Group Delay), such a refractive index profile guaranties a high modal bandwidth for a given wavelength, typically 850 nm.

Since data traffic over fiber optic networks continues to grow exponentially, there is an increasing demand for increasing per-fiber traffic particularly across long distances. To this end, multiplexing techniques have been developed that allow a plurality of separate data streams to share the same optical fiber. Among these techniques, one promising approach is space division multiplexing (SDM), in which a plurality of data channels within a single optical fiber are provided by a respective plurality of optical signal modes guided by the fiber.

Such a technique has required the development of new types of optical fibers, called few-mode optical fibers, which support more than one spatial mode but fewer spatial modes than the multi-mode fibers. Such few-mode fibers, which are notably discussed in the PCT patent document WO2011/094400, support approximately 2 to 50 modes.

Space-division-multiplexed transmissions using Few-Mode Fibers (FMFs) have hence recently received considerable attention because of their potential to multiply the capacity of single-mode transmissions by the number of modes that will be used.

One approach to the design of Few-Mode Fibers consists in minimizing mode coupling, so that each LP (Linear Polarization) mode can be separately detected using simple 2×2 (non-degenerate LP modes) or 4×4 (two-time degenerate LP modes) Multiple Input Multiple Output techniques, regardless the number of LP modes.

Increasing the number of LP modes that can actually be used is a challenging issue, since mode coupling increases when increasing the number of LP modes used for transmission.

A careful design of Few-Mode Fibers is hence required in order to reduce mode coupling that will ultimately limit the transmission reach. One can reduce this mode coupling by increasing the effective index difference between any subsequent LP modes. Such an increase in effective index difference may be achieved by increasing the core refractive index, which however causes an unwanted increase in attenuation losses and decrease in effective area. Effective area should be kept high to limit intra-mode non-linearity.

Patent document US2002/0164140 discloses a family of fiber profiles which exhibit only three well guided modes in the operative "band". The reduction in the number of modes is accomplished with a change in the refractive index in the core area. The change in refractive index in the core area changes the order of appearance of the modes, thus leading to fewer guided modes, and less multi-path interference (MPI). In one embodiment the refractive index ring comprises an area of depressed refractive index, and the null energy point of one of the guided modes is found therein. In another embodiment, the change in the refractive index in the core is located coincidentally with the null point of a desired mode. In some embodiments negative dispersion on the order of −400 ps/nm/km is experienced, while MPI is minimized. In another embodiment the fiber profile is further characterized by a negative slope suitable for compensating a link of transmission fiber.

Such a prior art FMF only supports 3 LP modes and is designed for dispersion compensation. A ring in the cladding is used to control dispersion and slope of dispersion of a high order mode.

Patent document US2014/0064686 discloses modified step index and GRaded INdex (GRIN) fibers with low core relative delta (near 0.8%) which have desirable properties for transmission. These lower delta fibers have lower attenuation losses due to reduced Rayleigh scattering, which is desirable to improve performance in multiple mode multiplexing. The fiber designs include optimized raised triangle profiles, and depressed cladding profiles, to support two and four LP modes.

Such a prior art design focuses on FMF with strong mode coupling between desired modes and elimination of undesired higher order modes.

None of these prior art designs allow the transmission capacity of a weakly coupled few mode fiber to be increased, while keeping attenuation losses low and Effective Area high.

There is therefore a need for an improved Few Mode Fiber profile, with increased transmission capacity, low attenuation losses and high Effective Area.

3. SUMMARY

In an embodiment of the present disclosure, a few mode optical fiber is disclosed, which comprises an optical core and an optical cladding surrounding the optical core. The few mode optical fiber has a step-index profile (i.e. a refractive index profile characterized by a uniform refractive index within the core and a sharp decrease in refractive index at the core-cladding interface so that the cladding is of a lower refractive index) and the optical cladding has at its outer edge (i.e. at the end of a glass part of the optical fiber) a refractive index $n_{Cl}$. The optical core has a core outer radius $R_1 \geq 7.5$ µm and a core refractive index difference $\Delta n_1$ with respect to the optical cladding refractive index $n_{Cl}$ such that $14.5 \times 10^{-3} < \Delta n_1 < 24 \times 10^{-3}$. The optical cladding comprises:

an index ring with:
- a ring inner radius $R_{r1}$ between 12 µm and 19 µm;
- a ring refractive index difference $\Delta n_r$ with respect to the optical cladding refractive index $n_{Cl}$ such that $\Delta n_1/\Delta n_r$ is between 2 and 4;
- a ring volume $V_{ring} = \pi \Delta n_r (Rr_2^2 - Rr_1^2)$ between 1.8 µm$^2$ and 4.1 µm$^2$ where $R_{r2}$ is the ring outer radius;

an inner cladding between the optical core and the index ring, with an inner cladding inner radius $R_{i1}$ and an inner cladding outer radius $R_{i2}$, the inner cladding having an inner cladding refractive index difference $\Delta n_{clad1}$ with respect to the optical cladding refractive index $n_{Cl}$ between $-1.0 \times 10^{-3}$ and $1.0 \times 10^{-3}$;

the refractive index differences $\Delta n_1$, $\Delta n_r$ and $\Delta n_{clad1}$ being determined at a wavelength $\lambda = 633$ nm.

The present disclosure thus relies on a novel and inventive approach to the design of Few Mode Fibers. Actually, the structural features of such an optical fiber allow the few mode optical fiber to guide more LP modes than the LP modes used for transmission. The higher order modes (HOM), which are not used for transmission, are spatially separated from the modes used for transmission by adding an index ring in the cladding. Such an index ring minimizes the spatial overlapping between the HOM and the LP modes used for transmission. Reducing spatial overlapping between the modes either allows mode coupling to be further reduced, with the same constraints on the index difference between the modes, or constraints on the index difference between the modes to be released, while keeping the same level of mode coupling.

Designing such a few mode fiber in which more LP modes are guided than the number of LP modes used for transmission thus allows the properties of the LP modes used for transmission to be improved. The weakly coupled few mode fiber according to the present disclosure shows an increased transmission capacity, while keeping attenuation losses low and Effective Area high, as compared to prior art FMF.

According to an embodiment of the present disclosure, the core outer radius $R_1$ and the inner cladding inner radius $R_{i1}$ are substantially equal, which means that $R_{i1} - R_1 \leq 1$ µm; and the inner cladding outer radius $R_{i2}$ and the ring inner radius $R_{r1}$ are substantially equal, which means that: $R_{r1} - R_{i2} \leq 1$ µm.

According to an embodiment of the present disclosure, the inner cladding refractive index difference $\Delta n_{clad1}$ with respect to the optical cladding refractive index $n_{Cl}$ is between $-0.5 \times 10^{-3}$ and $0.5 \times 10^{-3}$ at $\lambda = 633$ nm.

According to another embodiment of the present disclosure, the optical core comprises a depressed inner core surrounding an optical axis of the optical fiber, the depressed inner core having a depressed inner core outer radius $R_c$ such that $0.8$ µm $< R_c < (R_1 - 2)$ µm, and a uniform depressed inner core refractive index difference $\Delta n_c$ with respect to the optical cladding refractive index $n_{Cl}$ such that $0 < \Delta n_1 - \Delta n_c < 3.0 \times 10^{-3}$, the refractive index differences $\Delta n_c$ and $\Delta n_1$ being determined at $\lambda = 633$ nm.

Hence, according to this embodiment, the core comprises a depressed inner core with a uniform depressed inner core refractive index difference $\Delta n_c$, and an outer core with a uniform outer core refractive index difference $\Delta n_1$. Adding such a depressed inner core has the additional advantage of increasing the minimum index difference between the $LP_{21}$ and $LP_{02}$ modes, while reducing the coupling between the modes.

According to an embodiment, the optical cladding comprises an intermediate cladding with an intermediate cladding inner radius $R_{int1}$ and an intermediate cladding outer radius $R_2$, the intermediate cladding having an intermediate cladding refractive index difference $\Delta n_{clad2}$ with respect to the optical cladding refractive index $n_{Cl}$ between $-1.0 \times 10^{-3}$ and $1.0 \times 10^{-3}$ at $\lambda = 633$ nm, preferably between $-0.5 \times 10^{-3}$ and $0.5 \times 10^{-3}$ at $\lambda = 633$ nm.

According to an embodiment, the ring outer radius $R_{r2}$ and the intermediate cladding inner radius $R_{int1}$ are substantially equal, which means that $R_{int1} - R_{r2} \leq 1$ µm.

According to an embodiment, the intermediate cladding refractive index difference $\Delta n_{clad2}$ is such that $|\Delta n_{clad1} - \Delta n_{clad2}| \leq 1.0 \times 10^{-3}$. It is also possible that both the inner and the intermediate cladding have the same refractive index difference ($\Delta n_{clad1} = \Delta n_{clad2}$).

According to an embodiment, the intermediate cladding outer radius is such that $R_2 \leq 30$ µm. Such a feature eases manufacturing of the optical fiber.

According to an embodiment, the few mode optical fiber of the present disclosure guides at least n+1 LP modes, where n is an integer such that $6 \leq n \leq 12$, said at least n+1 LP modes comprising first n LP modes and at least one Higher Order Mode (HOM). A maximum Coupling-Overlapping Coefficient $COC_{max}$ between any two modes of said first n LP modes is below 25%, a maximum Coupling-Overlapping Coefficient $COC_{max}$ between any mode of said first n LP modes and any Higher Order Mode of said at least one Higher Order Mode is below 15%, where said Coupling-Overlapping Coefficient $COC_{\mu\nu,\kappa\iota}$ between a $LP_{\mu\nu}$ mode and a $LP_{\kappa\iota}$ mode is defined by the formula:

$$COC_{\mu\nu,\kappa\iota} = \frac{\eta_{\mu\nu,\kappa\iota}}{1 + (n_{eff_{\mu\nu}} - n_{eff_{\kappa\iota}}) \times 1000}$$

with:

$$\eta_{\mu\nu,\kappa\iota} = \frac{\iint |\psi_{\mu\nu}| \times |\psi_{\kappa\iota}| r dr d\theta}{\sqrt{\iint |\psi_{\mu\nu}|^2 r dr d\theta} \times \sqrt{\iint |\psi_{\kappa\iota}|^2 r dr d\theta}}$$

$\psi_{\mu\nu}$ a mode field amplitude distribution of the $LP_{\mu\nu}$ mode at radius r and angle θ, i.e. at polar distance r and angle θ coordinates system of axes transverse to and centered relative to the fiber, at the operating transmission wavelength for which the optical fiber is intended $\lambda_{op}$, $\psi_{\kappa\iota}$ a mode field amplitude distribution of the $LP_{\kappa\iota}$ mode at radius r and angle θ, i.e. at polar distance r and angle θ in a coordinates system of axes transverse to and centered relative to the fiber, at the operating transmission wavelength for which the optical fiber is intended, at $\lambda_{op}$, $n_{eff_{\mu\nu}}$ an effective refractive index of the $LP_{\mu\nu}$ mode, at $\lambda_{op}$,
$n_{eff_{\kappa\iota}}$ an effective refractive index of the $LP_{\kappa\iota}$ mode, at $\lambda_{op}$,
$\mu$, $\nu$, $\kappa$, $\iota$ being non-negative integers.

Hence, such a FMF guides at least six weakly-coupled LP modes used for transmission, and one or several unwanted higher order modes, which spatial overlapping with the used modes is minimized, thanks to the index ring added in the cladding. Moreover, the structural features of the ring index, width and position are properly chosen to get a Coupling-Overlapping Coefficient (COC) below 25% between the used LP modes, and below 15% between the unwanted HOM and the LP used modes.

The quantity $\eta_{\mu\nu,\kappa\iota}$ represents the spatial overlapping of the energy of the fields $\psi_{\mu\nu}$ for the $LP_{\mu\nu}$ mode, and $\psi_{\kappa\iota}$ for the $LP_{\kappa\iota}$ mode. The boundaries of the integral range from 0 to $2\pi$ for d$\theta$, and from 0 to the diameter of the optical fiber for dr, i.e. from 0 to 62.5 μm for example.

According to an embodiment of the present disclosure, the first n LP modes guided by the optical fiber have an effective area $A_{eff} > 80$ μm² at a wavelength $\lambda = \lambda_{op}$, where $\lambda_{op}$ is an operating transmission wavelength for which said optical fiber is intended.

Effective Area is thus kept high, which limits non-linear effects in the fiber.

According to an embodiment of the present disclosure, bend losses BL of the first n LP modes guided by the optical fiber are such that $|BL| < 10$ dB/turn, at 10 mm bend radius at $\lambda = \lambda_{op}$. BL can be characterized, for instance, by measuring the loss difference of a given mode selected by a mode multiplexer and injected in the few-mode fiber with and without applying a loop of 10 mm radius using a spectral attenuation bench.

According to an embodiment of the present disclosure, a minimum of effective index differences between any two modes $LP_{\mu\nu}$ and $LP_{\kappa\iota}$ among the n+1 first LP modes $\Delta n_{eff_{min}} = \min |Dn_{eff}(LP_{\mu\nu}) - Dn_{eff}(LP_{\kappa\iota})|$ is such that $\Delta n_{eff_{min}} > 0.5 \times 10^{-3}$,
where $Dn_{eff}(LP_{\mu\nu}) = n_{eff_{\mu\nu}} - n_{Cl}$
$Dn_{eff}(LP_{\kappa\iota}) = n_{eff_{\kappa\iota}} - n_{Cl}$
and $\mu$, $\nu$, $\kappa$, $\iota$ being non-negative integers.

Mode coupling in the fiber is thus kept at a low level, which allows simple MIMO techniques to be used at reception.

According to an embodiment of the present disclosure, the fundamental $LP_{01}$ mode guided by said optical fiber has an attenuation loss smaller than 0.28 dB/km at $\lambda = \lambda_{op}$. According to an embodiment of the present disclosure, $\lambda_{op}$ is between 1300 nm and 1600 nm, preferably $\lambda_{op} = 1550$ nm. It is noted that the FMFs described herein and throughout the document are suitable for use within, at a minimum, the entire "C-band" (1530 nm-1565 nm), but also with a suitable choice of the fiber structural features the S-(1460 nm-1530 nm), L-(1565 nm-1625 nm) and U-bands (1625 nm-1675 nm).

The present disclosure also concerns an optical link comprising at least one few mode optical fiber according to embodiments of the present disclosure.

Such an optical link may comprise any number of concatenated optical fibers, as long as one of them at least complies with the features set forth in the present disclosure. Such an optical link may also comprise several optical fibers, which would all comply with the features of the present disclosure.

The present disclosure also concerns an optical system comprising at least one few mode optical fiber or at least one optical link according to embodiments of the present disclosure.

4. BRIEF DESCRIPTION OF THE DRAWINGS

The present disclosure can be better understood with reference to the following description and drawings, given by way of example and not limiting the scope of protection, and in which:

FIG. 1 schematically depicts an isometric view of an exemplary few mode optical fiber according to one or more embodiments described herein;

FIG. 2 graphically provides the illustrative refractive index profile of few mode optical fibers according to a first embodiment of the present disclosure;

FIG. 3 graphically provides the illustrative refractive index profile of few mode optical fibers according to a second embodiment of the present disclosure;

Figure 1:
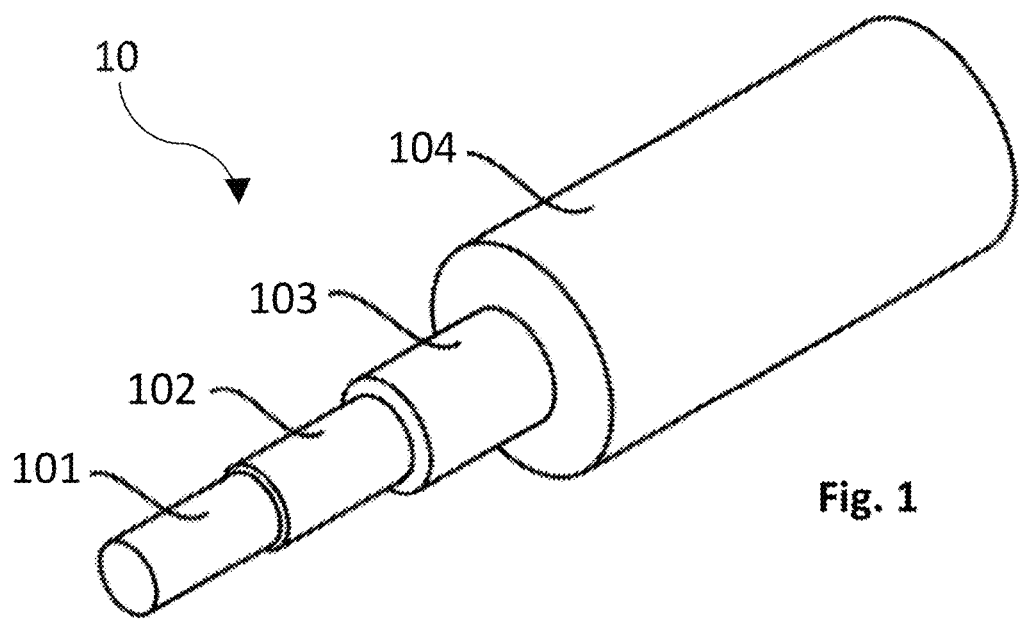

The components in the figures are not necessarily to scale, emphasis instead being placed upon illustrating the principles of the invention.

5. DETAILED DESCRIPTION

The general principle of the present disclosure relies on the careful design of a Few Mode Fiber for transmitting n=6 to n=12 useful LP modes, according to which the fiber profile guides more than n LP modes and the higher order modes (i.e. modes above n) are spatially separated from the modes used for transmission by adding a ring in the cladding.

It is actually recalled that light travelling in an optical fiber forms hybrid-type modes, which are usually referred to as LP (linear polarization) modes. The $LP_{0p}$ modes have two polarization degrees of freedom and are two-fold degenerate, the $LP_{mp}$ modes with m≥21 are four-fold degenerate. These degeneracies are not counted when designating the number of LP modes propagating in the fiber. Hence, a few-mode optical fiber having two LP modes supports the propagation of all of the $LP_{01}$ and $LP_{11}$ modes, or a few-mode fiber guiding 6 LP modes supports the propagation of all of the $LP_{01}$, $LP_{11}$, $LP_{02}$, $LP_{21}$, $LP_{12}$ and $LP_{31}$ modes.

Reference will now be made in detail to embodiments of multimode optical fibers, examples of which are illustrated in the accompanying drawings. Whenever possible, the same reference numerals will be used throughout the drawings to refer to the same or like parts.

One embodiment of a few-mode optical fiber according to the present disclosure is schematically depicted in isometric view in FIG. 1. The optical fiber 10 generally has a glass core 101 surrounded by a glass cladding. More precisely, the optical fiber 10 comprises four abutting concentric regions, namely:

- a step-index core 101, with an outer radius $R_1$;
- an inner cladding 102, with an inner radius $R_{r1}$ and an outer radius $R_{r2}$;
- an index ring 103, with an inner radius $R_{r1}$ and an outer radius $R_{r2}$;

an intermediate cladding 104, with an inner radius $Rr_{int1}$ and an outer radius $R_2$.

Though not illustrated on FIG. 1, the cladding also comprises an outer cladding abutting the intermediate cladding, ranging from radius $R_2$ to the end of the glass part of the fiber, with a refractive index $n_{Cl}$. In embodiments, the inner cladding inner radius and the core outer radius are substantially the same, i.e. $R_{i1}-R_1 \leq 1$ µm; the inner cladding outer radius $R_{i2}$ and the index ring inner radius $R_{r1}$ are substantially the same, i.e. $R_{r1}-R_{i2} \leq 1$ µm; and the index ring outer radius $R_{r2}$ and the intermediate cladding inner radius $R_{int1}$ are substantially the same, i.e. $R_{int1}-R_{r2} \leq 1$ µm. In the following description of figures and examples, it is assumed, for sake of simplicity, that $R_{i1}=R_1$, $R_{r1}=R_{i2}$, and $R_{int1}=R_{r2}$.

In embodiments of the present disclosure, the glass core 101 generally has an outer radius $R_1$ greater than or equal to 7.5 µm. Moreover, the index ring 103 has an inner radius $R_{r1}$ between 12 µm and 19 µm. In order to satisfy manufacturing constraints, it is preferred to have $R_2 \leq 30$ µm.

In the embodiments shown and described herein, the core 101 and the cladding generally comprise silica, specifically silica glass. The cross-section of the optical fiber 10 may be generally circular-symmetric with respect to the center of the core 101. In some embodiments described herein, the radius of the glass portion of the optical fiber 10 is about 62.5 µm. However, it should be understood that the dimensions of the cladding may be adjusted so that the radius of the glass portion of the optical fiber may be greater than or less than 62.5 µm. The optical fiber 10 also comprises a coating surrounding the cladding. Such a coating may comprise several layers, and it may notably be a dual-layer coating, although these different layers are not shown on FIG. 1.

The different portions in the cladding may comprise pure silica glass ($SiO_2$), silica glass with one or more dopants, which increase the index of refraction (e.g. $GeO_2$ or any other known dopant), such as when the portion of the cladding is "up-doped" (e.g. for the index ring 103), or silica glass with a dopant, which decreases the index of refraction, such as fluorine, such as when the portion of the cladding is "down-doped" (e.g. for the slightly down-doped inner cladding 102 or intermediate cladding 104).

Figure 2:
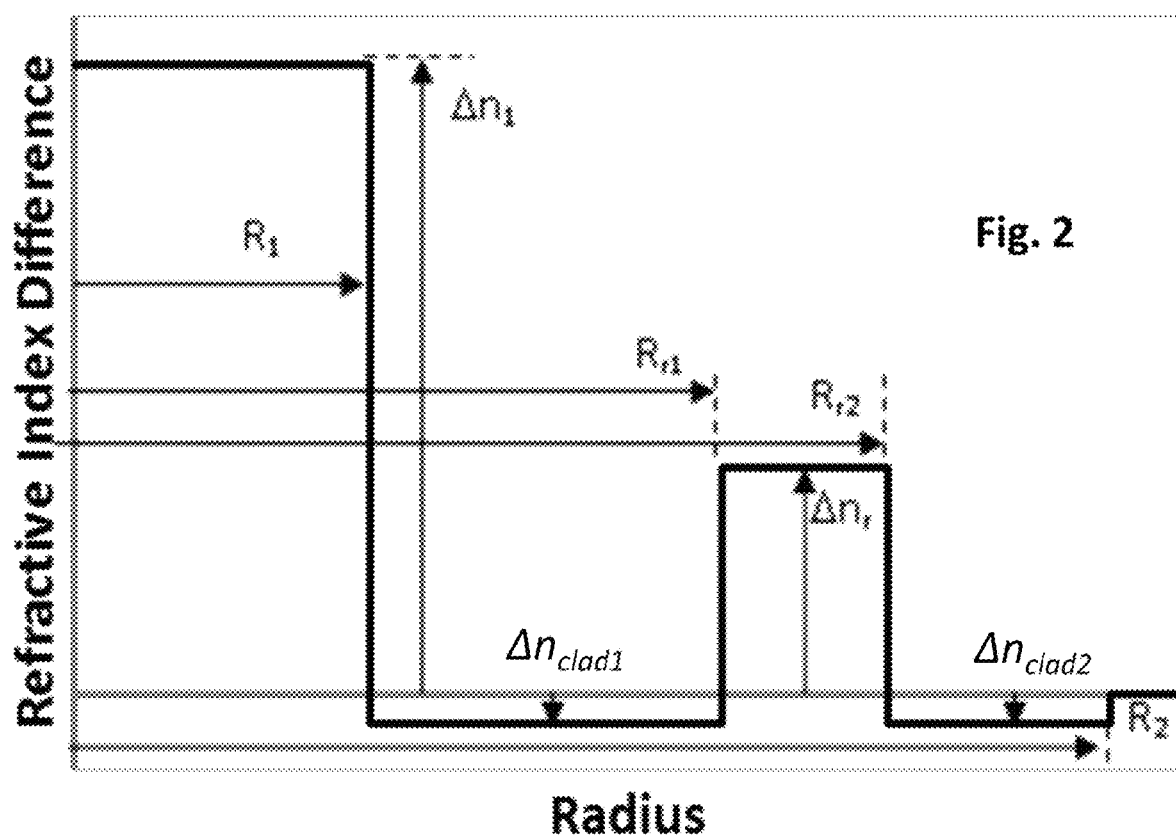

FIG. 2 depicts the refractive index profile n(r) of optical fiber 10 according to the embodiment of FIG. 1. It describes the relationship between the refractive index value n and the distance r from the center of the optical fiber. The x-axis represents radial position with x=0 representing the center of the core region 101, and the y-axis represents refractive index, expressed as an index difference $\Delta n$ unless otherwise stated. Throughout this document, refractive index differences are determined at a wavelength $\lambda=633$ nm, which is the wavelength commonly used to measure the refractive index of the fibers.

The refractive index profile of FIG. 2 is a step-index profile, characterized by a uniform refractive index within the core and a sharp decrease in refractive index at the core-cladding interface so that the cladding is of a lower refractive index.

More precisely, the optical core 101 has a core refractive index difference $\Delta n_1$ with respect to the optical cladding refractive index $n_{Cl}$ such that $14.5 \times 10^{-3} < \Delta n_1 < 24 \times 10^{-3}$. The optical cladding refractive index $n_{Cl}$ is the refractive index of the optical cladding at its outer edge, i.e. at the end of the glass part of the optical fiber.

Radius $R_1$ corresponds to the core-cladding interface. At distance $R_1$ from the core center, refractive index sharply decreases, to reach a value $\Delta n_{clad1}$, which corresponds to the refractive index difference of the inner cladding 102. The inner cladding refractive index difference $\Delta n_{clad1}$ with respect to the optical cladding refractive index $n_{Cl}$ is between $-1.0 \times 10^{-3}$ and $1.0 \times 10^{-3}$, preferably between $-0.5 \times 10^{-3}$ and $0.5 \times 10^{-3}$.

The cladding comprises an index ring 103, with a ring inner radius $R_{r1}$ between 12 µm and 19 µm, a positive ring refractive index difference $\Delta n_r$ with respect to the optical cladding refractive index $n_{Cl}$ such that $\Delta n_1/\Delta n_r$ is between 2 and 4, and a ring volume $V_{ring}=\pi \Delta n_r (Rr_2^2 - Rr_1^2)$ between 1.8 µm² and 4.1 µm² where $Rr_2$ is the ring outer radius.

At radius $R_{r2}$, corresponding to the boundary between the index ring 103 and the intermediate cladding 104, the refractive index decreases sharply and reaches a value $\Delta n_{clad2}$, which corresponds to the refractive index difference of the intermediate cladding 104. The intermediate cladding refractive index difference $\Delta n_{clad2}$ with respect to the optical cladding refractive index $n_{Cl}$ is between $-1.0 \times 10^{-3}$ and $1.0 \times 10^{-3}$, preferably between $-0.5 \times 10^{-3}$ and $0.5 \times 10^{-3}$.

In the embodiment of FIG. 2, $\Delta n_{clad2}=\Delta n_{clad1}$. However, this is not a mandatory feature, as long as $|\Delta n_{clad1} - \Delta n_{clad2}| \leq 1.0 \times 10^{-3}$.

Figure 3:
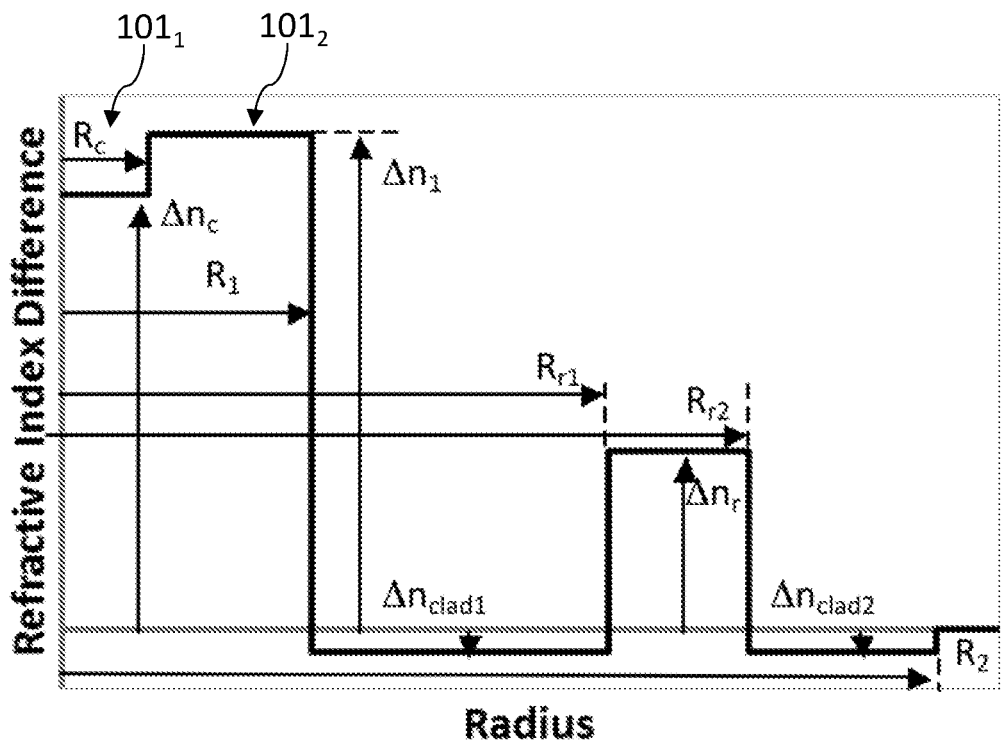

FIG. 3 depicts the refractive index profile n(r) of optical fiber 10 according to an alternate embodiment of the present disclosure. According to this embodiment, the core 101 comprises two abutting concentric regions, namely:
  a depressed inner core $101_1$, ranging from the optical axis of the optical fiber to an outer radius $R_c$ such that $0.8$ µm $< R_c < (R_1 - 2)$ µm and having a uniform depressed inner core refractive index difference $\Delta n_c$ with respect to the optical cladding refractive index $n_{Cl}$ such that $0 < \Delta n_1 - \Delta n_c < 3.0 \times 10^{-3}$;
  an outer core $101_2$, with inner radius $R_{c1}$ and outer radius $R_1$, and an outer core refractive index difference $\Delta n_1$ with respect to the optical cladding refractive index $n_{Cl}$ such that $14.5 \times 10^{-3} < \Delta n_1 < 24 \times 10^{-3}$.

In embodiments, the depressed inner core outer radius $R_c$ and the outer core inner radius $R_{c1}$ are substantially the same, i.e. $R_{c1}-R_c \leq 1$ µm. In the following description of examples and figures, it is assumed, for sake of simplification, that $R_c=R_{c1}$.

Depressed inner core $101_1$ and outer core $101_2$ are not illustrated on FIG. 1, for simplicity purpose, but the skilled person could easily replace the core region 101 by these two abutting concentric region $101_1$ and $101_2$ in the embodiment of FIG. 1.

Hence, the refractive index profile of FIG. 3 is a step-index profile with a depressed inner core region.

Radius $R_1$ corresponds to the core-cladding interface. At distance $R_1$ from the core center, refractive index sharply decreases, to reach a value $\Delta n_{clad1}$, which corresponds to the refractive index difference of the inner cladding 102. The inner cladding refractive index difference $\Delta n_{clad1}$ with respect to the optical cladding refractive index $n_{Cl}$ is between $-1.0 \times 10^{-3}$ and $1.0 \times 10^{-3}$, preferably between $-0.5 \times 10^{-3}$ and $0.5 \times 10^{-3}$.

The cladding comprises an index ring 103, with a ring inner radius $R_{r1}$ between 12 µm and 19 µm, a positive ring refractive index difference $\Delta n_r$ with respect to the optical cladding refractive index $n_{Cl}$ such that $\Delta n_1/\Delta n_r$ is between 2 and 4, and a ring volume $V_{ring}=\pi \Delta n_r (Rr_2^2 - Rr_1^2)$ between 1.8 µm² and 4.1 µm² where $R_{r2}$ is the ring outer radius.

At radius $R_{r2}$, corresponding to the boundary between the index ring 103 and the intermediate cladding 104, the refractive index decreases sharply and reaches a value $\Delta n_{clad2}$, which corresponds to the refractive index difference of the intermediate cladding 104. The intermediate cladding refractive index difference $\Delta n_{clad2}$ with respect to the optical cladding refractive index $n_{Cl}$ is between $-1.0 \times 10^{-3}$ and $1.0 \times 10^{-3}$, preferably between $-0.5 \times 10^{-3}$ and $0.5 \times 10^{-3}$.

In the embodiment of FIG. 3, $\Delta n_{clad2} = \Delta n_{clad1}$. However, this is not a mandatory feature, as long as $|\Delta n_{clad1} - \Delta n_{clad2}| \leq 1.0 \times 10^{-3}$.

The structural features of the Few Mode fibers of FIGS. 1 to 3 hence provide for an optical fiber which guides a greater number of modes than the ones used for transmission, with a ring added in the cladding to minimize spatial overlapping between modes used for transmission and unwanted higher-order modes. The structural features of the index ring (width, position and volume) induce a Coupling-Overlapping Coefficient (COC) below 25% between the LP modes used for transmitting useful information and below 15% between the unwanted HOM and the used LP modes.

Such a Coupling-Overlapping Coefficient between a $LP_{\mu\nu}$ mode and a $LP_{\kappa\iota}$ mode is defined by the formula:

$$COC_{\mu\nu,\kappa\iota} = \frac{\eta_{\mu\nu,\kappa\iota}}{1 + (n_{eff_{\mu\nu}} - n_{eff_{\kappa\iota}}) \times 1000}$$

with:

$$\eta_{\mu\nu,\kappa\iota} = \frac{\int\int |\psi_{\mu\nu}| \times |\psi_{\kappa\iota}| r dr d\theta}{\sqrt{\int\int |\psi_{\mu\nu}|^2 r dr d\theta} \times \sqrt{\int\int |\psi_{\kappa\iota}|^2 r dr d\theta}}$$

$\psi_{\mu\nu}$ the mode field amplitude distribution of the $LP_{\mu\nu}$ mode,
$\psi_{\kappa\iota}$ the mode field amplitude distribution of the $LP_{\kappa\iota}$ mode,
$n_{eff_{\mu\nu}}$ the effective refractive index of the $LP_{\mu\nu}$ mode,
$n_{eff_{\kappa\iota}}$ the effective refractive index of the $LP_{\kappa\iota}$ mode,
$\mu, \nu, \kappa, \iota$ being non-negative integers.

The quantity $\eta_{\mu\nu,\kappa\iota}$ represents the spatial overlapping of the energy of the fields $\psi_{\mu\nu}$ for the $LP_{\mu\nu}$ mode, and $\psi_{\kappa\iota}$ for the $LP_{\kappa\iota}$ mode. The boundaries of the integral range from 0 to $2\pi$ for $d\theta$, and from 0 to the diameter of the optical fiber for dr, i.e. from 0 to 62.5 μm for example. The mode field amplitude distributions are given at radius r and angle θ, i.e. at polar distance r and angle θ coordinates of a point in a system of axes transverse to and centered relative to the fiber.

Table 1 below lists the features of the refractive index profiles of four exemplary few mode fibers according to the present disclosure. More precisely, examples Ex. 1, Ex. 2 and Ex. 3 correspond to the exemplary embodiment of FIG. 3, and are few mode fibers comprising a depressed inner core, within a step-index profile. Example Ex. 4 corresponds to the exemplary embodiment of FIG. 2, and is a step-index few mode fiber which core has a uniform refractive index.

All four examples in Table 1 fulfill the structural requirements of:
- a core with radius $R_1 \geq 7.5$ μm and core index difference $14.5 \times 10^{-3} < \Delta n_1 < 24 \times 10^{-3}$;
- an index ring surrounding the core with an inner radius $R_{r1}$ between 12 and 19 μm and ring index difference $\Delta n_r$ such that $\Delta n_1 / \Delta n_r$ is between 2 and 4;
- an inner cladding between the core and index ring having index difference $\Delta n_{clad1}$ between $-1.0 \times 10^{-3}$ and $1.0 \times 10^{-3}$;
- a ring volume $V_{ring}$ between 1.8 and 4.1 μm².

The detailed characteristics of the four examples Ex. 1, Ex. 2, Ex. 3 and Ex. 4 are disclosed in Table 2 below.

In Table 2, the first column corresponds to the list of characteristics which are measured and evaluated for each exemplary few mode fiber; the second column lists the LP modes; the third to sixth columns respectively correspond to exemplary fibers Ex. 1, Ex. 2, Ex. 3 and Ex. 4. Measurements and evaluations of Table 2 are achieved at an operating wavelength $\lambda_{op} = 1550$ nm.

As may be observed, exemplary fibers Ex. 1, Ex. 2, Ex. 3 and Ex. 4 guide fourteen LP modes, among which the first six modes $LP_{01}$, $LP_{11}$, $LP_{21}$, $LP_{02}$, $LP_{31}$ and $LP_{12}$ are used for transmitting useful information. Eight more HOM, namely $LP_{03}$, $LP_{13}$, $LP_{22}$, $LP_{32}$, $LP_{41}$, $LP_{42}$, $LP_{51}$, $LP_{61}$ and $LP_{71}$ are unwanted modes, which are also guided by the fiber.

TABLE 2

| Characteristics | LP modes | Ex.1 | Ex.2 | Ex.3 | Ex.4 |
| --- | --- | --- | --- | --- | --- |
| | LP 0 1 | 14.2 | 14.2 | 14.2 | 14.6 |
| Dneff | LP 1 1 | 12.3 | 12.3 | 12.3 | 12.4 |
| (10-3) | LP 2 1 | 9.6 | 9.6 | 9.6 | 9.5 |
| | LP 0 2 | 7.9 | 7.9 | 7.9 | 8.6 |
| | LP 3 1 | 6.1 | 6.1 | 6.1 | 6.0 |
| | LP 1 2 | 3.9 | 3.9 | 3.9 | 4.2 |
| | LP 0 3 | 3.1 | 3.0 | 3.0 | 3.4 |
| | LP 1 3 | 3.1 | 3.0 | 3.0 | 3.3 |
| | LP 2 2 | 2.9 | 2.8 | 2.8 | 3.1 |
| | LP 3 2 | 2.6 | 2.5 | 2.5 | 2.8 |
| | LP 4 1 | 2.2 | 2.2 | 2.2 | 2.4 |
| | LP 4 2 | 2.2 | 2.1 | 2.2 | 2.0 |
| | LP 5 1 | 1.7 | 1.7 | 1.7 | 1.9 |
| | LP 6 1 | 1.1 | 1.1 | 1.1 | 1.2 |
| | LP 7 1 | 0.4 | 0.4 | 0.5 | 0.4 |
| Aeff | LP 0 1 | 149 | 149 | 149 | 125 |
| (μm²) | LP 1 1 | 117 | 117 | 117 | 115 |
| | LP 2 1 | 121 | 121 | 121 | 120 |
| | LP 0 2 | 101 | 101 | 101 | 103 |
| | LP 3 1 | 123 | 123 | 123 | 123 |
| | LP 1 2 | 116 | 115 | 115 | 110 |
| BL R = 10 mm | LP 0 1 | <0.001 | <0.001 | <0.001 | <0.001 |
| (dB/turn) | LP 1 1 | <0.001 | <0.001 | <0.001 | <0.001 |
| | LP 2 1 | <0.001 | <0.001 | <0.001 | <0.001 |
| | LP 0 2 | <0.001 | <0.001 | <0.001 | <0.001 |
| | LP 3 1 | <0.01 | <0.01 | <0.01 | <0.01 |
| | LP 1 2 | <1 | <1 | <1 | <1 |
| loss (dB/km) | LP01 | 0.25 | 0.25 | 0.25 | 0.24 |

TABLE 1

| Examples | $R_C$ (μm) | $R_1$ (μm) | $R_{r1}$ (μm) | $R_{r2}$ (μm) | $R_2$ (μm) | $\Delta n_c$ (10⁻³) | $\Delta n_1$ (10⁻³) | $\Delta n_{clad1}$ (10⁻³) | $\Delta n_r$ (10⁻³) | $\Delta n_{clad2}$ (10⁻³) | $V_{ring}$ (μm²) | $\Delta n_1/\Delta n_r$ |
| --- | --- | --- | --- | --- | --- | --- | --- | --- | --- | --- | --- | --- |
| Ex.1 | 2.8 | 8.01 | 16.5 | 22 | 23 | 14.7 | 16.7 | -0.2 | 5.5 | -0.2 | 3.7 | 3.0 |
| Ex.2 | 2.8 | 8.01 | 17.5 | 22 | 23 | 14.7 | 16.7 | -0.2 | 6 | -0.2 | 3.4 | 2.8 |
| Ex.3 | 2.8 | 8.01 | 18.5 | 22 | 23 | 14.7 | 16.7 | -0.2 | 7 | -0.2 | 3.1 | 2.4 |
| Ex.4 | — | 7.98 | 16.5 | 21 | 24 | — | — | -0.2 | 6.5 | -0.2 | 3.4 | 2.6 |

TABLE 2-continued

| Characteristics | LP modes | Ex.1 | Ex.2 | Ex.3 | Ex.4 |
|---|---|---|---|---|---|
| $\Delta neff_{min}$ (10-3) | 6LP modes | 0.7 | 0.8 | 0.9 | 0.8 |
| COCmax | with HOM | 10% | 12% | 10% | 13% |
| COCmax | between 6 LP modes | 19% | 17% | 14% | 22% |

Table 2 provides the refractive index difference of each guided LP mode with respect to the refractive index of the outer cladding: $Dn_{eff}(LP_{\mu\nu})=n_{eff_{\mu\nu}}-n_{Cl}$. It also discloses the minimum refractive index difference $\Delta n_{eff_{min}}$ of the first six $LP_{\mu\nu}$ modes ($LP_{01}$, $LP_{11}$, $LP_{21}$, $LP_{02}$, $LP_{31}$ and $LP_{12}$) with their neighboring following modes (i.e. with the modes $LP_{\kappa\iota}$ having the closest lower $Dn_{eff}$ value), which corresponds to the minimum value of $|Dn_{eff}(LP_{\mu\nu})-Dn_{eff}(LP_{\kappa\iota})|$ when $LP_{\mu\nu}$ and $LP_{\kappa\iota}$ are neighboring modes. For all four examples Ex. 1 to Ex. 4 the minimum refractive index difference $\Delta n_{eff_{min}}$ is obtained for the sixth LP mode, and corresponds to the difference $|Dn_{eff}(LP_{12})-Dn_{eff}(LP_{03})|$. It must be noted that the slight difference which may appear in Table 2 between the value given for $\Delta n_{eff_{min}}$ and the computing result for the difference $|Dn_{eff}(LP_{12})-Dn_{eff}(LP_{03})|$ derives from a mathematical approximation, when considering the second decimal (which does not appear in Table 2) for $Dn_{eff}$.

It thus appears that $\Delta n_{eff_{min}}$ is greater than $0.7 \times 10^{-3}$ for all exemplary fibers, which guarantees low coupling between the first six LP modes used for transmission.

Moreover, for all four examples, the first six modes $LP_{01}$, $LP_{11}$, $LP_{21}$, $LP_{02}$, $LP_{31}$ and $LP_{12}$ have an effective area $A_{eff}$ greater than 101 $\mu m^2$ for examples Ex. 1 to Ex. 3 (corresponding to the $LP_{02}$ mode) and greater than 103 $\mu m^2$ for example Ex. 4 (also corresponding to the $LP_{02}$ mode), which limits intra-mode non-linearity. As used herein, the effective area of an optical fiber is the area of the optical fiber in which light is propagated and is determined at the specified mode, at a wavelength of 1550 nm, unless otherwise specified. The effective area $A_{eff_{\mu\nu}}$ of mode $LP_{\mu\nu}$ is defined as follows:

If $\mu \neq 0$:

$$A_{eff_{\mu\nu}} = \frac{4\pi}{3} \frac{\left(\int_0^\infty |\psi_{\mu\nu}|^2 r dr\right)^2}{\int_0^\infty |\psi_{\mu\nu}|^4 r dr}$$

Where $\psi_{\mu\nu}$ is the mode field amplitude distribution of the mode $LP_{\mu\nu}$ at the radius r, i.e. at the polar distance r in the polar coordinates of a point in a system of axes transverse to and centered relative to the fiber;

And if $\mu = 0$:

$$A_{eff_{0\nu}} = 2\pi \frac{\left(\int_0^\infty |\psi_{0\nu}|^2 r dr\right)^2}{\int_0^\infty |\psi_{0\nu}|^4 r dr}$$

Table 2 also provides assessment of the bending losses per turn of 10 mm bending radius for the first six used LP modes for all four exemplary fibers Ex. 1 to Ex. 4. While characterization of FMFs is not standardized yet, the bending loss data illustrated in Table 2 are given according to measurements complying with the requirements of the IEC 60793-1-47 (ed.2.0), which is herein incorporated by reference. To properly characterize macrobending losses of the $LP_{01}$ mode, 2 m of SMF can be spliced on the injection side of FMF under test to filter out the high order modes. For the high order modes, it is necessary to use mode converters at the input and the output of the FMF to correctly evaluate power in the desired modes.

As may be observed, bending loss remains very low, even for the $LP_{12}$ mode for which it is below 1 dB/turn at 10 mm radius.

The attenuation loss for the fundamental $LP_{01}$ mode is of 0.25 dB/km for exemplary fibers Ex. 1 to Ex. 3 and of 0.24 dB/km for exemplary fiber Ex. 4. Loss of $LP_{01}$ mode can be measured according to IEC 60793-1-40 (ed1.0) standard (method A), which is herein incorporated by reference. However, in order to properly characterize the losses of the fundamental mode, 2 m of SMF can be spliced on the injection side of FMF under test to filter out the high order modes.

The maximum Coupling-Overlapping Coefficient $COC_{max}$ between the first six LP modes is below 20% for exemplary fibers Ex. 1 to Ex. 3, and amounts to 22% for exemplary fiber Ex. 4. Although the presence of an index ring adds eight HOMs to the first six guided LP modes, its dimensions and position have been chosen so that the maximum Coupling-Overlapping Coefficient $COC_{max}$ between the HOMs and the first six LP modes is below 15% for all examples.

Table 3 below illustrates in more details the Coupling-Overlapping Coefficient between the 6 guided LP modes of exemplary fiber Ex. 3 ($LP_{01}$, $LP_{11}$, $LP_{21}$, $LP_{02}$, $LP_{31}$, $LP_{12}$) and the two High Order Modes ($LP_{41}$ & $LP_{42}$) which have the highest COC values with the guided modes.

TABLE 3

| COC | $LP_{01}$ | $LP_{11}$ | $LP_{21}$ | $LP_{02}$ | $LP_{31}$ | $LP_{12}$ | $LP_{41}$ | $LP_{42}$ |
|---|---|---|---|---|---|---|---|---|
| $LP_{01}$ | — | 12% | 7% | 12% | 4% | 3% | 2% | 2% |
| $LP_{11}$ | 12% | — | 14% | 4% | 7% | 7% | 3% | 4% |
| $LP_{21}$ | 7% | 14% | — | 8% | 11% | 6% | 4% | 6% |
| $LP_{02}$ | 12% | 4% | 8% | — | 7% | 6% | 2% | 3% |
| $LP_{31}$ | 4% | 7% | 11% | 7% | — | 12% | 7% | 11% |
| $LP_{12}$ | 3% | 7% | 6% | 6% | 12% | — | 10% | 15% |
| $LP_{41}$ | 2% | 3% | 4% | 2% | 7% | 10% | — | 95% |
| $LP_{42}$ | 2% | 4% | 6% | 3% | 11% | 15% | 95% | — |

The maximum Coupling-Overlapping Coefficient $COC_{max}$ between the first six LP modes is achieved between $LP_{21}$ and $LP_{11}$ and is 14%. The maximum coupling between one of the first six LP modes and the HOM modes not used for transmission is 10%, achieved between $LP_{12}$ and $LP_{41}$ modes. The coupling between HOMs can be very high (95% between $LP_{41}$ and $LP_{42}$), but this is not a problem, as these high-order modes are not used for transmitting information.

As a comparison, Table 4 provides the refractive index profiles of five other exemplary few mode fibers, namely Ex. 1o to Ex. 5o, which are all out of the scope of the present disclosure.

TABLE 4

| Examples | $R_C$ (µm) | $R_1$ (µm) | $R_{r1}$ (µm) | $R_{r2}$ (µm) | $R_2$ (µm) | $\Delta n_c$ ($10^{-3}$) | $\Delta n_1$ ($10^{-3}$) | $\Delta n_{clad1}$ ($10^{-3}$) | $\Delta n_r$ ($10^{-3}$) | $\Delta n_{clad2}$ ($10^{-3}$) | $V_{ring}$ (µm²) | $\Delta n_1/\Delta n_r$ |
|---|---|---|---|---|---|---|---|---|---|---|---|---|
| Ex.1o | 2.8 | 8.01 | — | — | 19.75 | 14.7 | 16.7 | — | — | −0.2 | — | — |
| Ex.2o | 2.8 | 8.01 | 9.5 | 15 | 23 | 14.7 | 16.7 | −0.2 | 6 | −0.2 | 2.5 | 2.8 |
| Ex.3o | 2.8 | 8.01 | 15.5 | 17 | 23 | 14.7 | 16.7 | −0.2 | 8 | −0.2 | 1.2 | 2.1 |
| Ex.4o | 1.5 | 6.88 | — | — | 19.75 | 16.7 | 18.8 | — | — | −0.2 | — | — |
| Ex.5o | — | 7.98 | — | — | 19 | — | 16.65 | — | — | −0.2 | — | — |

The detailed characteristics of the five examples Ex. 1o, Ex. 2o, Ex. 3o, Ex. 4o and Ex. 5o are disclosed in Table 5 below.

Like in Table 2, in Table 5, the first column corresponds to the list of characteristics which are measured and evaluated for each exemplary few mode fiber; the second column lists the LP modes; the third to seventh columns respectively correspond to exemplary fibers Ex. 1o, Ex. 2o, Ex. 3o, Ex. 4o and Ex. 5o. Measurements and evaluations of Table 5 are achieved at an operating wavelength λ=1550 nm.

Example Ex.1o is a step index FMF with a depressed inner core supporting 7 LP modes, i.e. $LP_{01}$, $LP_{11}$, $LP_{21}$, $LP_{02}$, $LP_{31}$, $LP_{12}$ and $LP_{41}$. The requirements of the present disclosure as regards the core ($R_1$=8.01 µm>7.5 µm and core index difference $14.5 \times 10^{-3} < \Delta n_1 = 16.7 \times 10^{-3} < 24 \times 10^{-3}$) and the refractive index difference of the intermediate cladding ($-1.0 \times 10^{-3} < \Delta n_{clad2} = -0.2 \times 10^{-3} < 1.0 \times 10^{-3}$) are fulfilled, however, there is no index ring in the cladding. Table 6 below shows the Coupling-Overlapping coefficient in-between the different guided modes ($LP_{01}$, $LP_{11}$, $LP_{21}$, $LP_{02}$, $LP_{31}$, $LP_{12}$ and $LP_{41}$).

The maximum coupling between the first six LP modes (COC=20%) is reached between $LP_{11}$ and $LP_{21}$ modes. Nevertheless, while $\Delta n_{eff_{min}} = 1.7 \times 10^{-3}$ (see Table 5), the maximum Coupling-Overlapping coefficient ($COC_{max}$=22%) is reached between the $LP_{12}$ and $LP_{41}$ guided modes, the latter being the highest order mode (HOM) not necessarily used for transmission added either to increase the minimum refractive index difference between the first six LP modes or to increase Aeff and to reduce loss of all the first six guided modes compared to a six LP guided mode fiber (as Ex.4o).

TABLE 5

| Characteristics | LP modes | Ex.1o | Ex.2o | Ex.3o | Ex.4o | Ex.5o |
|---|---|---|---|---|---|---|
| Dneff ($10^{-3}$) | LP 01 | 14.2 | 14.2 | 14.2 | 16.0 | 14.6 |
| | LP 11 | 12.3 | 12.4 | 12.3 | 7.9 | 12.4 |
| | LP 21 | 9.6 | 9.6 | 9.6 | 13.3 | 9.5 |
| | LP 02 | 7.9 | 8.0 | 7.9 | 2.7 | 8.6 |
| | LP 31 | 6.1 | 6.3 | 6.1 | 9.6 | 6.0 |
| | LP 12 | 3.9 | 4.6 | 3.9 | 5.1 | 4.2 |
| | LP 03 | — | 3.3 | 1.1 | — | — |
| | LP 13 | — | 2.5 | 1.0 | — | — |
| | LP 22 | — | 3.0 | 0.8 | — | — |
| | LP 32 | — | 2.0 | 0.4 | — | — |
| | LP 41 | 2.2 | 2.7 | 2.2 | — | 2.0 |
| | LP 42 | — | 0.7 | — | — | — |
| | LP 51 | — | 0.3 | — | — | — |
| | LP 61 | — | — | — | — | — |
| | LP 71 | — | — | — | — | — |
| Aeff (µm²) | LP 01 | 149 | 150 | 149 | 103 | 125 |
| | LP 11 | 117 | 118 | 117 | 88 | 115 |
| | LP 21 | 121 | 124 | 121 | 94 | 120 |
| | LP 02 | 101 | 109 | 101 | 84 | 103 |
| | LP 31 | 123 | 134 | 123 | 98 | 123 |
| | LP 12 | 115 | 232 | 115 | 94 | 109 |

TABLE 5-continued

| Characteristics | LP modes | Ex.1o | Ex.2o | Ex.3o | Ex.4o | Ex.5o |
|---|---|---|---|---|---|---|
| BL R = 10 mm (dB/turn) | LP 01 | <0.001 | <0.001 | <0.001 | <0.001 | <0.001 |
| | LP 11 | <0.001 | <0.001 | <0.001 | <0.001 | <0.001 |
| | LP 21 | <0.001 | <0.001 | <0.001 | <0.001 | <0.001 |
| | LP 02 | <0.001 | <0.001 | <0.001 | <0.001 | <0.001 |
| | LP 31 | <0.01 | <0.01 | <0.01 | <0.01 | <0.01 |
| | LP 12 | <1 | <1 | <1 | <10 | <1 |
| loss (dB/km) | LP01 | 0.25 | 0.25 | 0.25 | 0.28 | 0.24 |
| $\Delta neff_{min}$ ($10^{-3}$) | 6LP modes | 1.7 | 1.2 | 1.7 | 1.7 | 1.0 |
| COCmax | with HOM | 22% | 23% | 29% | — | 18% |
| COCmax | between 6 LP modes | 20% | 22% | 23% | 19% | 22% |

TABLE 6

| COC | $LP_{01}$ | $LP_{11}$ | $LP_{21}$ | $LP_{02}$ | $LP_{31}$ | $LP_{12}$ | $LP_{41}$ |
|---|---|---|---|---|---|---|---|
| $LP_{01}$ | — | 15% | 7% | 12% | 4% | 3% | 2% |
| $LP_{11}$ | 15% | — | 20% | 6% | 11% | 9% | 6% |
| $LP_{21}$ | 7% | 20% | — | 13% | 18% | 9% | 9% |
| $LP_{02}$ | 12% | 6% | 13% | — | 12% | 8% | 5% |
| $LP_{31}$ | 4% | 11% | 18% | 12% | — | 19% | 16% |
| $LP_{12}$ | 3% | 9% | 9% | 8% | 19% | — | 22% |
| $LP_{41}$ | 2% | 6% | 9% | 5% | 16% | 22% | — |

For this exemplary FMF Ex. 1o, the coupling between the first six LP modes and the HOM is thus too high. According to the present disclosure, a solution to this problem consists in adding a ring in the cladding of the exemplary fiber Ex. 1o, which leads to exemplary fibers Ex. 1 to Ex. 3 already discussed above in this document. As compared to Ex. 1o, the FMF of examples Ex. 1, Ex. 2 and Ex. 3 achieve approximately the same values of Effective Area $A_{eff}$, bend losses BL and attenuation losses (see Tables 2 and 5). However, as already discussed, the Coupling-Overlapping Coefficient $COC_{max}$ between the first six LP modes is reduced below 20% for all three examples (see Table 2), although $\Delta n_{eff_{min}}$ is reduced below $1 \times 10^{-3}$, and the Coupling-Overlapping Coefficient $COC_{max}$ between HOMs and the first six LP modes is reduced below 15%.

The exemplary fiber Ex. 4o is a FMF supporting only six LP modes, and is also out of the scope of the present disclosure. It is a step-index fiber with a depressed inner core nut no index ring in the cladding. To achieve $\Delta n_{eff_{min}} = 1.7 \times 10^{-3}$, the core refractive index must be increased compared to that of few mode fibers guiding more than six LP modes. The consequence is a strong increase in attenuation losses, which increase from 0.25 dB/km for exemplary fiber Ex. 1o to 0.28 dB/km for exemplary fiber Ex. 4o for the fundamental $LP_{01}$ mode at 1550 nm. Table 7 below shows the coupling-overlapping coefficient between the first six LP modes for exemplary fiber Ex. 4o.

TABLE 7

| COC | $LP_{01}$ | $LP_{11}$ | $LP_{21}$ | $LP_{02}$ | $LP_{31}$ | $LP_{12}$ |
|---|---|---|---|---|---|---|
| $LP_{01}$ | — | 11% | 5% | 9% | 3% | 3% |
| $LP_{11}$ | 11% | — | 16% | 6% | 8% | 7% |
| $LP_{21}$ | 5% | 16% | — | 13% | 14% | 8% |
| $LP_{02}$ | 9% | 6% | 13% | — | 9% | 6% |
| $LP_{31}$ | 3% | 8% | 14% | 9% | — | 19% |
| $LP_{12}$ | 3% | 7% | 8% | 6% | 19% | — |

Although the coupling-overlapping coefficient between the first six modes is low enough to achieve a weakly-coupled few mode fiber, the increase in core index causes an unwanted increase in attenuation losses and decrease in effective area $A_{eff}$ (see Table 5).

Figure 4A:
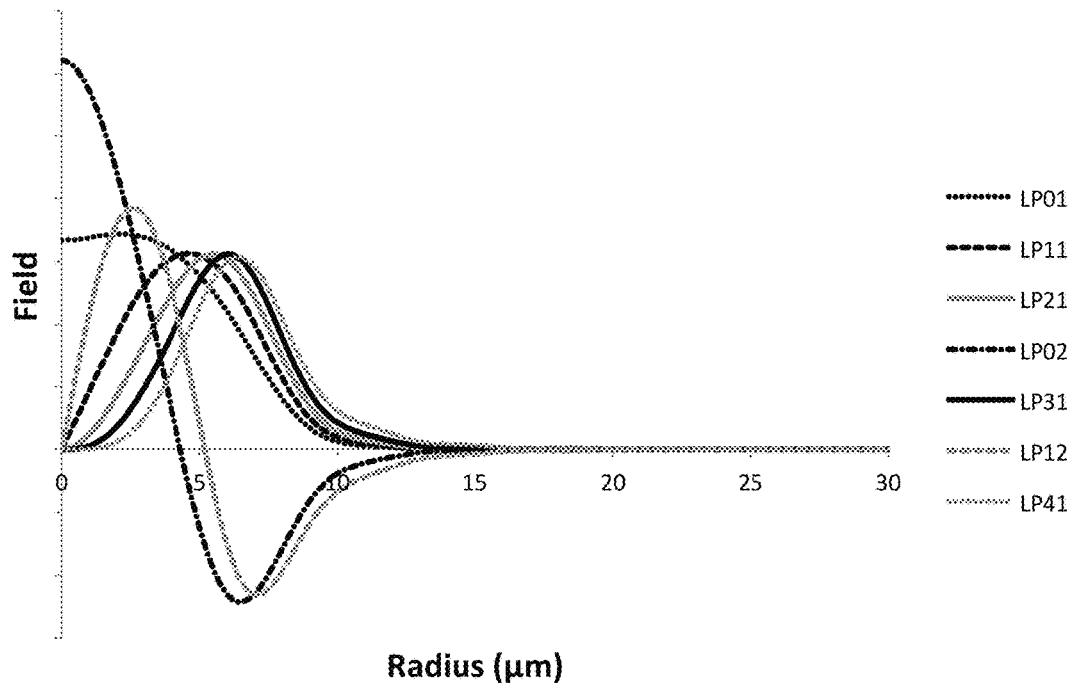
FIGS. 4A and 4B illustrate the impact of the index ring, added in the cladding of FMF according to the present disclosure, on spatial overlapping between modes.
Figure 4B:
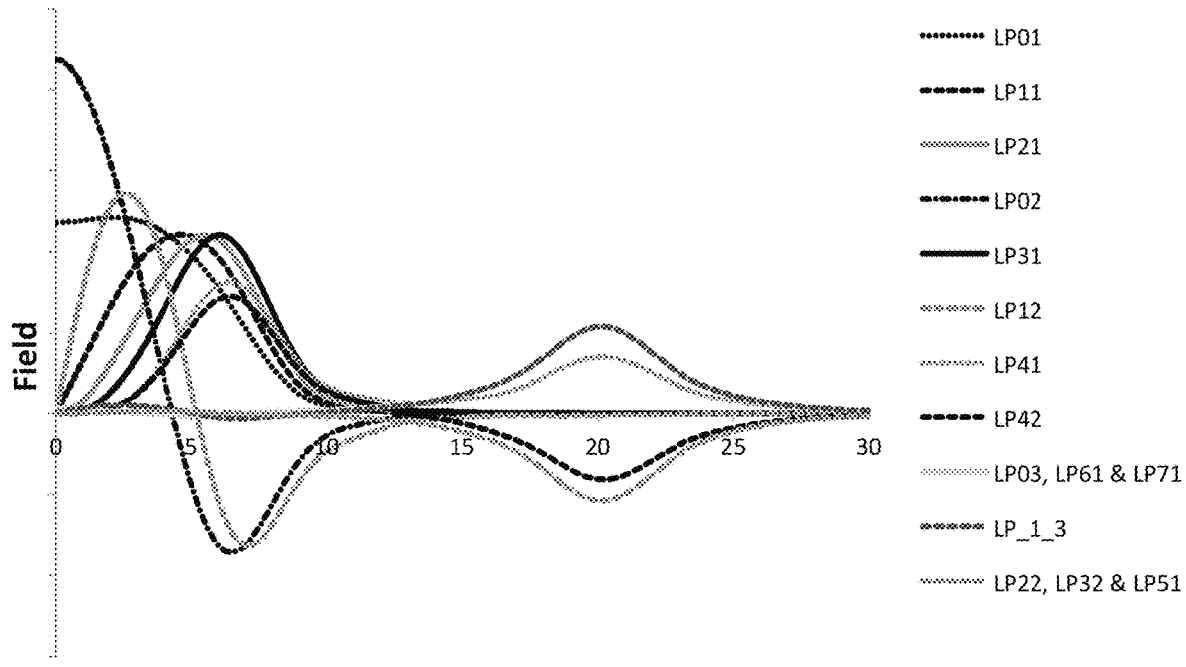

FIGS. 4A and 4B illustrate the impact of the index ring, added in the cladding of FMF according to the present disclosure, on spatial overlapping between modes. More precisely, FIG. 4A illustrates, on the y-axis, the normalized field (no unit) of seven LP modes ($LP_{01}$, $LP_{11}$, $LP_{21}$, $LP_{02}$, $LP_{31}$, $LP_{12}$, $LP_{41}$), as a function, on the x-axis, of the radius of the optical fiber, expressed in microns, for few mode fibers with no ring in the cladding (for the FMF of Ex. 1o).

FIG. 4B illustrates, on the y-axis, the normalized field (no unit) of fifteen LP modes (from $LP_{01}$ to $LP_{71}$), as a function, on the x-axis, of the radius of the optical fiber, expressed in microns, for few mode fibers according to the present disclosure (for the FMF of Ex. 3).

As may be observed when comparing FIGS. 4A and 4B, adding a ring in the cladding puts the energy of the $LP_{41}$ mode aside from the core, thus reducing its overlapping with lower order modes. Actually, FIG. 4B shows new peaks in the fields of HOMs for a radius between 15 and 25 microns approximately, thus outside of the core. The energy of these HOMs is essentially located in the ring, their energy in the core is decreased, thus improving the Coupling-Overlapping coefficient between the first six LP modes and the HOMs.

However, if the index ring added in the cladding is not well designed, either in terms of dimensions or position, its effects can be null or even penalizing compared to the design of a FMF fiber profile with no ring. This is illustrated by examples Ex. 2o and Ex. 3o, which are two FMF profiles with a depressed inner core, a ring added in the cladding, yet out of the scope of the present disclosure.

In example Ex. 2o, the requirements of the present disclosure as regards the core (core outer radius $R_1=8.01$ µm>7.5 µm and core index difference $14.5 \times 10^{-3} < \Delta n_1 = 16.7 \times 10^{-3} < 24 \times 10^{-3}$) and the refractive index difference of both the inner and intermediate cladding ($-1.0 \times 10^{-3} < \Delta n_{clad2} = \Delta n_{clad1} = -0.2 \times 10^{-3} < 1.0 \times 10^{-3}$) are fulfilled. The depressed inner core has an outer radius $R_c$ such that 0.8 µm<$R_c$=2.8 µm<$(R_1-2)$µm=8.01 µm-2.8 µm=5.21 µm, and a uniform depressed inner core refractive index difference $\Delta n_c = 14.7 \times 10^{-3}$ such that $0 < \Delta n_1 - \Delta n_c < 3.0 \times 10^{-3}$. The volume of the index ring is within the specified range: 1.8 µm²<$V_{ring}$=2.5 µm²<4.1 µm². The refractive index difference of the ring $\Delta n_r = 6$ is such that $\Delta n_1 / \Delta n_r$ is between 2 and 4.

However, the index ring is not properly positioned in the cladding, as it is too close to the core: $R_{r1}=9.5$ µm<12 µm.

As a consequence, the maximum Coupling-Overlapping coefficient $COC_{max}$ between the first six LP modes on the one hand, and between the first six LP modes and the HOMs on the other hand, is increased, when compared to the same profile without ring of exemplary fiber Ex. 1o. Actually, $COC_{max}$ between the first six LP modes is 20% for Ex. 1o and 22% for Ex. 2o, and $COC_{max}$ with HOMs is 22% for Ex. 1o and 23% for Ex. 2o (see Table 5).

Adding a ring in the cladding is hence not enough, if it is not well positioned with respect to the core.

In example Ex. 3o, the requirements of the present disclosure as regards the core (core outer radius $R_1=8.01$ µm>7.5 µm and core index difference $14.5 \times 10^{-3} < \Delta n_1 = 16.7 \times 10^{-3} < 24 \times 10^{-3}$) and the refractive index difference of both the inner and intermediate cladding ($-1.0 \times 10^{-3} < \Delta n_{clad2} = \Delta n_{clad1} = -0.2 \times 10^{-3} < 1.0 \times 10^{-3}$) are fulfilled. The depressed inner core has an outer radius $R_c$ such that 0.8 µm<$R_c$=2.8 µm<$(R_1-2)$µm=8.01 µm-2.8 µm=5.21 µm, and a uniform depressed inner core refractive index difference $\Delta n_c = 14.7 \times 10^{-3}$ such that $0 < \Delta n_1 - \Delta n_c < 3.0 \times 10^{-3}$. The refractive index difference of the ring $\Delta n_r = 8$ is such that $\Delta n_1 / \Delta n_r$ is between 2 and 4. The index ring is properly positioned in the cladding, as 12 µm<$R_1$=15.5 µm<19 µm.

However, the volume of the index ring is too small: $V_{ring}=1.2$ µm²<1.8 µm².

As a consequence, the maximum Coupling-Overlapping coefficient $COC_{max}$ between the first six LP modes on the one hand, and between the first six LP modes and the HOMs on the other hand, is increased, when compared to the same profile without ring of exemplary fiber Ex. 1o. Actually, $COC_{max}$ between the first six LP modes is 20% for Ex. 1o and 23% for Ex. 3o, and $COC_{max}$ with HOMs is 22% for Ex. 1o and 29% for Ex. 2o (see Table 5).

Adding a ring in the cladding is hence not enough, if its volume is not well designed.

Example Ex. 5o shows a refractive index profile which is similar to that of example Ex. 4, but with no ring added in the cladding. When comparing both profiles, it appears that adding a ring in the cladding for example Ex. 4 allows $COC_{max}$ with HOMs to be reduced from 18% to 13% while $\Delta n_{eff_{min}}$ has been reduced from $1 \times 10^{-3}$ to $0.8 \times 10^{-3}$. Other characteristics are unchanged (see Tables 2 and 5).

Table 8 presents the refractive index profiles of two other exemplary Few-mode fibers according to the present disclosure, namely Ex. 5 and Ex. 6. Both exemplary fibers are step-index fibers, with an index ring added in the cladding, and satisfy the structural requirements of:

a core with radius $R_1 \geq 7.5$ µm and core index difference $14.5 \times 10^{-3} < \Delta n_1 < 24 \times 10^{-3}$;

an index ring surrounding the core with an inner radius $R_{r1}$ between 12 and 19 µm and ring index difference $\Delta n_r$ such that $\Delta n_1 / \Delta n_r$ is between 2 and 4;

an inner cladding between the core and index ring having index difference $\Delta n_{clad1}$ between $-1.0 \times 10^{-3}$ and $1.0 \times 10^{-3}$;

a ring volume $V_{ring}$ between 1.8 and 4.1 µm².

Their refractive index profile corresponds to the one illustrated on FIG. 2.

TABLE 8

| Examples | $R_C$ (μm) | $R_1$ (μm) | $R_{r1}$ (μm) | $R_{r2}$ (μm) | $R_2$ (μm) | $\Delta n_c$ ($10^{-3}$) | $\Delta n_1$ ($10^{-3}$) | $\Delta n_{clad1}$ ($10^{-3}$) | $\Delta n_r$ ($10^{-3}$) | $\Delta n_{clad2}$ ($10^{-3}$) | $V_{ring}$ (μm²) | $\Delta n_1/\Delta n_r$ |
|---|---|---|---|---|---|---|---|---|---|---|---|---|
| Ex.5 | — | 7.5 | 14.5 | 20.5 | 24.0 | — | 23.9 | 0.0 | 6.0 | 0.0 | 4.0 | 4.0 |
| Ex.6 | — | 8.2 | 19 | 22 | 24.0 | — | 21.8 | −0.2 | 5.5 | −0.2 | 2.1 | 4.0 |

Exemplary fiber Ex. 5 guides seventeen LP modes, among which the first seven LP modes are used for transmission, and the ten others are HOMs, which are not used for transmission. The detailed characteristics of exemplary FMF Ex. 5 are disclosed in Table 9 below, which shows the same structure and content as Tables 2 and 5 discussed previously.

Exemplary fiber Ex. 6 guides sixteen LP modes, among which the first ten LP modes are used for transmission, and the six others are HOMs, which are not used for transmission. The detailed characteristics of exemplary FMF Ex. 6 are disclosed in Table 10 below, which also shows the same structure and content as Tables 2 and 5 discussed previously.

Tables 9 and 10 provide the refractive index difference of each guided LP mode with respect to the refractive index of the outer cladding: $Dn_{eff}(LP_{\mu\nu}) = n_{eff_{\mu\nu}} - n_{Cl}$. It also discloses the minimum refractive index difference $\Delta n_{eff_{min}}$ of the first $LP_{\mu\nu}$ modes, which are used for transmission (namely, $LP_{01}$, $LP_{11}$, $LP_{21}$, $LP_{02}$, $LP_{31}$, $LP_{12}$ and $LP_{41}$ for Ex. 5 and $LP_{01}$, $LP_{11}$, $LP_{21}$, $LP_{02}$, $LP_{31}$, $LP_{12}$, $LP_{41}$, $LP_{22}$, $LP_{03}$ and $LP_{51}$ for Ex. 6), with their neighboring following modes (i.e. with the modes $LP_{\kappa\iota}$ having the closest lower $Dn_{eff}$ value), which corresponds to the minimum value of $|Dn_{eff}(LP_{\mu\nu}) - Dn_{eff}(LP_{\kappa\iota})|$ when $LP_{\mu\nu}$ and $LP_{\kappa\iota}$ are neighboring modes. For example Ex. 5, the minimum refractive index difference $\Delta n_{eff_{min}}$ is obtained for the third LP mode, and corresponds to the difference $|Dn_{eff}(LP_{21}) - Dn_{eff}(LP_{02})|$. For example Ex. 6, the minimum refractive index difference $\Delta n_{eff_{min}}$ is obtained for the eighth LP mode, and corresponds to the difference $|Dn_{eff}(LP_{22}) - Dn_{eff}(LP_{03})|$.

TABLE 9

| Characteristics | LP modes | Ex.5 |
|---|---|---|
| $Dn_{eff}$ ($10^{-3}$) | $LP_{01}$ | 21.2 |
| | $LP_{11}$ | 18.4 |
| | $LP_{21}$ | 14.7 |
| | $LP_{02}$ | 13.5 |
| | $LP_{31}$ | 10.3 |
| | $LP_{12}$ | 7.9 |
| | $LP_{41}$ | 5.2 |
| | $LP_{03}$ | 3.8 |
| | $LP_{13}$ | 3.7 |
| | $LP_{22}$ | 3.5 |
| | $LP_{32}$ | 3.1 |
| | $LP_{42}$ | 2.6 |
| | $LP_{51}$ | 2.0 |
| | $LP_{23}$ | 1.8 |
| | $LP_{61}$ | 1.3 |
| | $LP_{04}$ | 1.1 |
| | $LP_{71}$ | 0.4 |
| $A_{eff}$ (μm²) | $LP_{01}$ | 99 |
| | $LP_{11}$ | 91 |
| | $LP_{21}$ | 94 |
| | $LP_{02}$ | 80 |
| | $LP_{31}$ | 95 |
| | $LP_{12}$ | 82 |
| | $LP_{41}$ | 97 |
| BL R = 10 mm (dB/turn) | $LP_{01}$ | <0.001 |
| | $LP_{11}$ | <0.001 |
| | $LP_{21}$ | <0.001 |
| | $LP_{02}$ | <0.001 |
| | $LP_{31}$ | <0.001 |

TABLE 9-continued

| Characteristics | LP modes | Ex.5 |
|---|---|---|
| | $LP_{12}$ | <0.001 |
| | $LP_{41}$ | <0.001 |
| Attenuation loss (dB/km) | $LP_{01}$ | 0.28 |
| $\Delta n_{eff_{min}}$ ($10^{-3}$) | First 7 LP modes | 1.2 |
| $COC_{max}$ | with HOM | 13% |
| $COC_{max}$ | between first 7 LP modes | 18% |

TABLE 10

| Characteristics | LP modes | Ex.6 |
|---|---|---|
| $Dn_{eff}$ ($10^{-3}$) | $LP_{01}$ | 19.6 |
| | $LP_{11}$ | 17.4 |
| | $LP_{21}$ | 14.5 |
| | $LP_{02}$ | 13.6 |
| | $LP_{31}$ | 11.0 |
| | $LP_{12}$ | 9.1 |
| | $LP_{41}$ | 7.0 |
| | $LP_{22}$ | 4.1 |
| | $LP_{03}$ | 3.4 |
| | $LP_{51}$ | 2.4 |
| | $LP_{04}$ | 1.7 |
| | $LP_{13}$ | 1.7 |
| | $LP_{23}$ | 1.5 |
| | $LP_{32}$ | 1.2 |
| | $LP_{42}$ | 0.9 |
| | $LP_{52}$ | 0.4 |
| $A_{eff}$ (μm²) | $LP_{01}$ | 126 |
| | $LP_{11}$ | 115 |
| | $LP_{21}$ | 119 |
| | $LP_{02}$ | 101 |
| | $LP_{31}$ | 118 |
| | $LP_{12}$ | 101 |
| | $LP_{41}$ | 118 |
| | $LP_{22}$ | 120 |
| | $LP_{03}$ | 113 |
| | $LP_{51}$ | 121 |
| BL R = 10 mm (dB/turn) | $LP_{01}$ | <0.001 |
| | $LP_{11}$ | <0.001 |
| | $LP_{21}$ | <0.001 |
| | $LP_{02}$ | <0.001 |
| | $LP_{31}$ | <0.001 |
| | $LP_{12}$ | <0.001 |
| | $LP_{41}$ | <0.001 |
| | $LP_{22}$ | <0.001 |
| | $LP_{03}$ | <0.1 |
| | $LP_{51}$ | <1 |
| loss (dB/km) | $LP_{01}$ | 0.27 |
| $\Delta n_{eff_{min}}$ ($10^{-3}$) | First 10 LP modes | 0.7 |
| $COC_{max}$ | with HOM | 3% |
| $COC_{max}$ | between first 10 LP modes | 22% |

It thus appears that $\Delta n_{eff_{min}}$ is greater than or equal to $0.7 \times 10^{-3}$ for both exemplary fibers, which guarantees low coupling between the first seven or ten LP modes used for transmission.

Moreover, for example Ex. 5, the first seven LP modes have an effective area $A_{eff}$ greater than 80 μm² (corresponding to the $LP_{02}$ mode); for example Ex. 6, the first ten LP modes have an effective area $A_{eff}$ greater than 101 µm² (also corresponding to the $LP_{02}$ mode). This limits intra-mode non-linearity.

Tables 9 and 10 also provide assessment of the bending losses per turn of 10 mm bending radius for the first used LP modes for both exemplary fibers Ex. 5 and Ex. 6.

As may be observed, bending loss remains very low, even for the $LP_{51}$ mode of exemplary fiber Ex. 6 for which it is below 1 dB/turn at 10 mm radius. As regards exemplary fiber Ex. 5, the bending loss remains below 0.001 dB/turn at 10 mm radius for all first seven LP modes used for transmission.

The attenuation loss for the fundamental $LP_{01}$ mode is of 0.28 dB/km for exemplary fiber Ex. 5 and of 0.27 dB/km for exemplary fiber Ex. 6.

The maximum Coupling-Overlapping Coefficient $COC_{max}$ between the first seven LP modes is 18% for exemplary fiber Ex. 5, and amounts to 22% between the first ten LP modes for exemplary fiber Ex. 6. Although the presence of an index ring adds HOMs to the first weakly-coupled guided LP modes, its dimensions and position have been chosen so that the maximum Coupling-Overlapping Coefficient $COC_{max}$ between the HOMs and the first seven or ten LP modes is below 15% for all examples, namely of 13% for exemplary fiber Ex. 5 and of 3% only for exemplary fiber Ex. 6.

Figure 5:
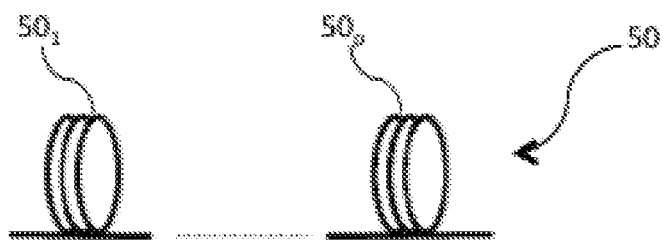
FIG. 5 illustrates an optical link according to an embodiment of the present disclosure.

FIG. 5 illustrates an optical link 50 according to an embodiment of the present disclosure. Such an optical link comprises p spans of optical fibers, with p≥2, which are spliced together. FIG. 5 only shows optical fiber $50_1$ and optical fiber $50_p$, all the other potential optical fibers in the optical link being symbolized by dashed lines. At least one of the optical fibers in optical link 50 is such that it comprises the features of one embodiment described above. In other words, at least one of the optical fibers supports more LP guided modes than the ones used for transmission and shows the specific design of the refractive index profile described above in relation to FIGS. 2 and 3, and notably, a carefully-designed index ring, added in the cladding, which reduces overlapping of the HOMs with the first weakly-coupled LP modes used for transmitting useful information.

Figure 6A:
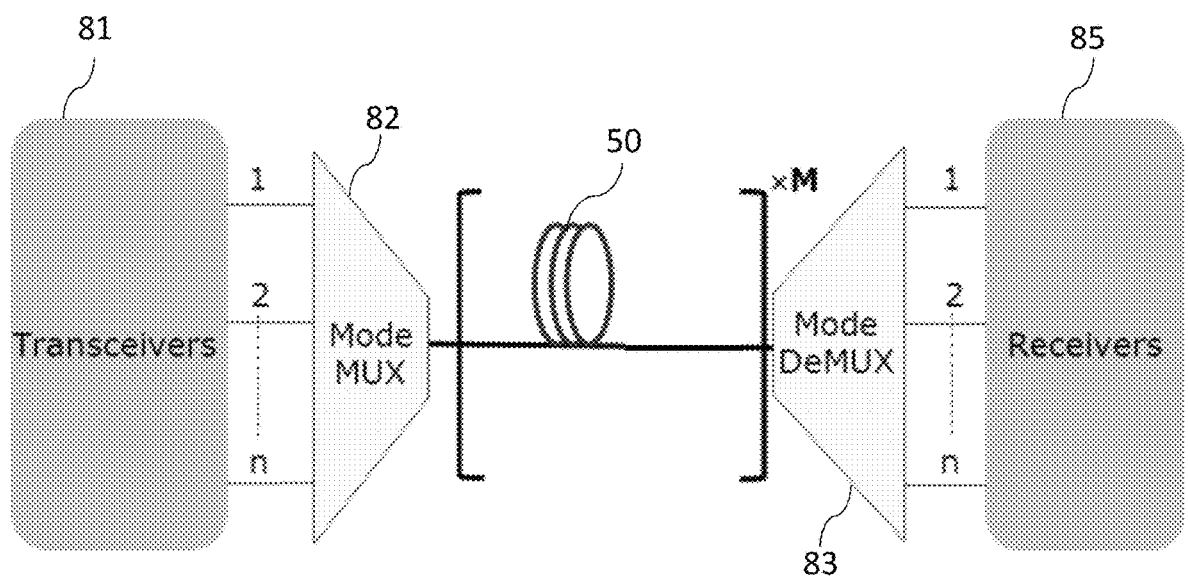
FIGS. 6A, 6B and 6C illustrate embodiments of an optical system according to the present disclosure.
Figure 6B:
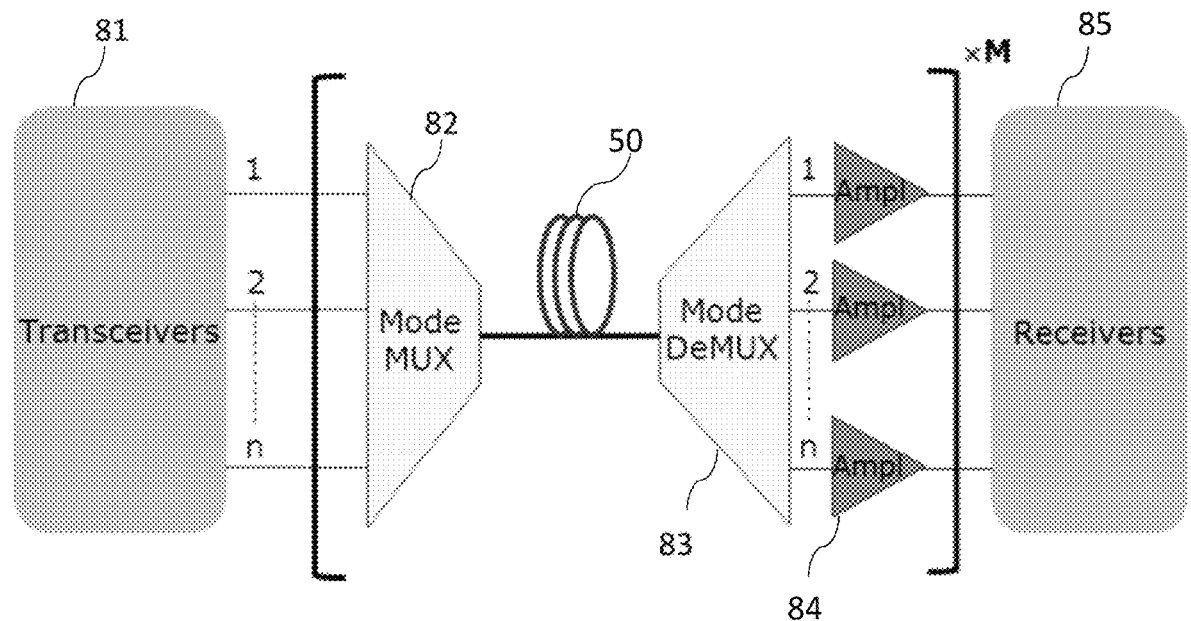
Figure 6C:
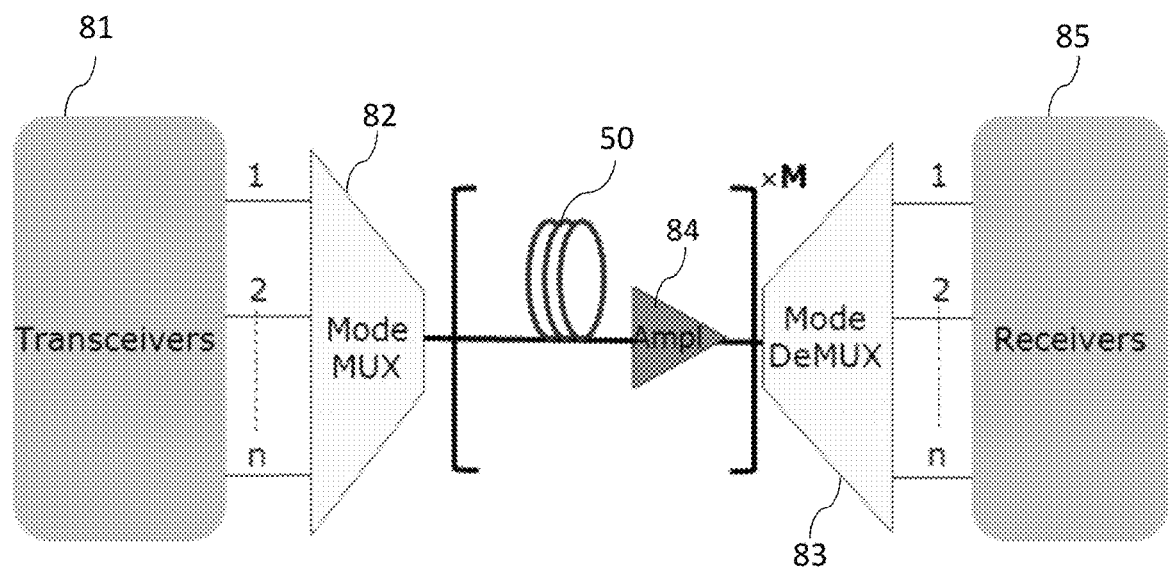

FIGS. 6A, 6B, and 6C illustrate embodiments of an optical system according to the present disclosure.

According to the first embodiment in FIG. 6A, such an optical system comprises transceivers 81 and receivers 85 optically connected by an optical fiber link 50 that includes at least one span of fiber. Transceivers 81 comprise light sources (such as lasers) and generate n LP modes, referenced 1, 2, . . . , n used in the optical system of FIG. 6A. A mode multiplexer 82 multiplexes the n LP modes and is optically connected to optical link 50, which guides the n multiplexed LP modes, towards a mode demultiplexer 83, which is optically connected to the end of optical link 50.

Such an optical system may comprise M optical links (or M spans of optical fibers). In an example, M=1; in another example, M=2; in another example M=5; in yet another example, M=10. In case the optical system comprises M optical links or spans, there is only one mode multiplexer 82, optically connected between transceivers 81 an optical link 50, and only one mode demultiplexer 83, optically connected between optical link 50 and receivers 85.

According to the second embodiment in FIG. 6B, such an optical system comprises transceivers 81 and receivers 85 optically connected by an optical fiber link 50 that includes at least one span of fiber. Transceivers 81 comprise light sources (such as lasers) and generate n LP modes, referenced 1, 2, . . . , n used in the optical system of FIG. 6B. A mode multiplexer 82 multiplexes the n LP modes and is optically connected to optical link 50, which guides the n multiplexed LP modes, towards a mode demultiplexer 83, which is optically connected to the end of optical link 50.

Mode demultiplexer 83 demultiplexes the n multiplexed LP modes, and feeds each LP mode into an amplifier 84. At the output of amplifiers 84, LP modes enter receivers 85.

Such an optical system may comprise M optical links (or M spans of optical fibers). In an example, M=1; in another example, M=2; in another example M=5; in yet another example, M=10. In case the optical system comprises M optical links or spans, it also comprises M mode multiplexers 82, M mode demultiplexers 83, and M amplifiers 84 for each LP mode guided by the optical system.

The embodiment in FIG. 6C differs from the second embodiment in FIG. 6B in that amplifier 84 amplifies all LP modes guided by the optical fiber 50; as such, amplifier 84 is optically connected between the output of optical link 50 and the input of mode demultiplexer 83. In this second embodiment, when the optical system comprises M optical links or spans, it also comprises M amplifiers 84; however, there is only one mode multiplexer 82, optically connected between transceivers 81 an optical link 50, and only one mode demultiplexer 83, optically connected between amplifier 84 and receivers 85.

The embodiments of FIGS. 6A, 6B and 6C are given as mere examples, and an optical fiber according to the present disclosure may of course be used in any other kind of optical system.

The invention claimed is:

1. A few mode optical fiber comprising an optical core and an optical cladding surrounding the optical core,
    said optical fiber comprising a step-index profile and said optical cladding having at its outer edge a refractive index $n_{Cl}$,
    wherein said optical core comprises a core outer radius $R_1 \geq 7.5$ µm and a core refractive index difference $\Delta n_1$ with respect to said optical cladding refractive index $n_{Cl}$ such that $14.5 \times 10^{-3} < \Delta n_1 < 24 \times 10^{-3}$,
    and wherein said optical cladding comprises:
        an index ring with:
            a ring inner radius $R_{r1}$ between 12 µm and 19 µm;
            a ring refractive index difference $\Delta n_r$ with respect to said optical cladding refractive index $n_{Cl}$ such that $\Delta n_1/\Delta n_r$ is between 2 and 4;
            a ring volume $V_{ring} = \pi \Delta n_r (R r_2^2 - R r_1^2)$ between 1.8 µm² and 4.1 µm² where $R_{r2}$ is the ring outer radius;
        an inner cladding between said optical core and said index ring, with an inner cladding inner radius $R_{i1}$ and an inner cladding outer radius $R_{i2}$, said inner cladding having an inner cladding refractive index difference $\Delta n_{clad1}$ with respect to said optical cladding refractive index $n_{Cl}$ between $1.0 \times 10^{-3}$ and $1.0 \times 10^{-3}$;
    said refractive index differences $\Delta n_1$, $\Delta n_r$ and $\Delta n_{clad1}$ being determined at a wavelength $\lambda = 633$ nm.

2. The few mode optical fiber of claim 1, wherein said ring inner radius $R_{r1}$ and said inner cladding outer radius $R_{i2}$ are substantially equal, and wherein said core outer radius $R_1$ and said inner cladding inner radius $R_{i1}$ are substantially equal.

3. The few mode optical fiber of claim 1, wherein said inner cladding refractive index difference $\Delta n_{clad1}$ with respect to said optical cladding refractive index $n_{Cl}$ is between $-0.5 \times 10^{-3}$ and $0.5 \times 10^{-3}$ at $\lambda = 633$ nm.

4. The few mode optical fiber of claim 1, wherein said optical core comprises a depressed inner core surrounding an optical axis of said optical fiber, said depressed inner core having a depressed inner core outer radius $R_c$ such that $0.8$ µm$<R_c<(R_1-2)$µm, and a uniform depressed inner core refractive index difference $\Delta n_c$ with respect to said optical cladding refractive index $n_{Cl}$ such that $0<\Delta n_1-\Delta n_c<3.0\times 10^{-3}$, said refractive index differences $\Delta n_c$ and $\Delta n_1$ being determined at $\lambda=633$ nm.

5. The few mode optical fiber of claim 1, wherein said optical cladding comprises an intermediate cladding with an intermediate cladding inner radius $R_{int1}$ and an intermediate cladding outer radius $R_2$, said intermediate cladding having an intermediate cladding refractive index difference $\Delta n_{clad2}$ with respect to said optical cladding refractive index $n_{Cl}$ between $-1.0\times 10^{-3}$ and $1.0\times 10^{-3}$ at $\lambda=633$ nm.

6. The few mode optical fiber of claim 5, wherein said ring outer radius $R_{r2}$ and said intermediate cladding inner radius $R_{int1}$ are substantially equal.

7. The few mode optical fiber of claim 5, wherein said intermediate cladding refractive index difference $\Delta n_{clad2}$ is such that $|\Delta n_{clad1}-\Delta n_{clad2}|\leq 1.0\times 10^{-3}$.

8. The few mode optical fiber of claim 5, wherein said intermediate cladding outer radius is such that $R_2 \leq 30$ µm.

9. The few mode optical fiber of claim 1, wherein it guides first n LP modes and at least one Higher Order Mode (HOM), where n is an integer such that $6 \leq n \leq 12$,
wherein a maximum Coupling-Overlapping Coefficient $COC_{max}$ between any two modes of said first n LP modes is below 25%,
wherein a maximum Coupling-Overlapping Coefficient $COC_{max}$ between any mode of said first n LP modes and any Higher Order Mode of said at least one Higher Order Mode is below 15%,
where said Coupling-Overlapping Coefficient $COC_{\mu\nu,\kappa\iota}$ between a $LP_{\mu\nu}$ mode and a $LP_{\kappa\iota}$ mode is defined by the formula:

$$COC_{\mu\nu,\kappa\iota} = \frac{\eta_{\mu\nu,\kappa\iota}}{1+(n_{eff_{\mu\nu}}-n_{eff_{\kappa\iota}})\times 1000}$$

with:

$$\eta_{\mu\nu,\kappa\iota} = \frac{\int\int |\psi_{\mu\nu}|\times|\psi_{\kappa\iota}|rdrd\theta}{\sqrt{\int\int|\psi_{\mu\nu}|^2 rdrd\theta}\times\sqrt{\int\int|\psi_{\kappa\iota}|^2 rdrd\theta}}$$

$\psi_{\mu\nu}$ a mode field distribution of the $LP_{\mu\nu}$ mode at polar distance r and angle $\theta$ in a coordinates system of axes transverse to and centered relative to said fiber, at a wavelength $\lambda=\lambda_{op}$, where $\lambda_{op}$ is an operating transmission wavelength for which said optical fiber is intended, $\psi_{\kappa\iota}$ a mode field distribution of the $LP_{\kappa\iota}$ mode at polar distance r and angle $\theta$ in a coordinates system of axes transverse to and centered relative to said fiber, at $\lambda=\lambda_{op}$, $n_{eff_{\mu\nu}}$ an effective refractive index of the $LP_{\mu\nu}$ mode at $\lambda=\lambda_{op}$, $n_{eff_{\kappa\iota}}$ an effective refractive index of the $LP_{\kappa\iota}$ mode at $\lambda=\lambda_{op}$, $\mu, \nu, \kappa, \iota$ being non-negative integers.

10. The few mode optical fiber of claim 9, wherein said first n LP modes guided by said optical fiber have an effective area $A_{eff}>80$ µm$^2$ at $\lambda=\lambda_{op}$ where $\lambda_{op}$ is an operating transmission wavelength for which said optical fiber is intended.

11. The few mode optical fiber of claim 9, wherein bend losses BL of said first n LP modes guided by said optical fiber are such that $|BL|<10$ dB/turn, at 10 mm bend radius at $\lambda=\lambda_{op}$.

12. The few mode optical fiber of claim 9, wherein a minimum of effective index differences between any two modes $LP_{\mu\nu}$ and $LP_{\kappa\iota}$ among the first n LP modes $\Delta n_{eff_{min}}=\min |Dn_{eff}(LP_{\mu\nu})-Dn_{eff}(LP_{\kappa\iota})|$ is such that $\Delta n_{eff_{min}}>0.5\times 10^{-3}$,
where $Dn_{eff}(LP_{\mu\nu})=n_{eff_{\mu\nu}}-n_{Cl}$
$Dn_{eff}(LP_{\kappa\iota})=n_{eff_{\kappa\iota}}-n_{Cl}$
and $\mu, \nu, \kappa, \iota$ being non-negative integers.

13. The few mode optical fiber of claim 1, wherein a fundamental $LP_{01}$ mode guided by said optical fiber has an attenuation loss smaller than 0.28 dB/km at $\lambda=\lambda_{op}$, and where $\lambda_{op}$ is an operating transmission wavelength for which said optical fiber is intended.

14. The few mode optical fiber of claim 1, wherein $\lambda_{op}$ is between 1300 nm and 1600 nm and where $\lambda_{op}$ is an operating transmission wavelength for which said optical fiber is intended.

15. An optical link comprising at least one few mode optical fiber according to claim 1.

16. An optical system comprising at least one few mode optical fiber according to claim 1.

17. An optical system comprising at least one optical link according to claim 15.

* * * * *